United States Patent
Reiser

[11] Patent Number: 6,057,611
[45] Date of Patent: *May 2, 2000

[54] SWITCHING CONTROL OF AN OPERATING CIRCUIT

[75] Inventor: Ludwig Reiser, Gersthofen, Germany

[73] Assignee: Patent-Treuhand-Gesellschaft fuer elektrische Gluehlampen mbH, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/036,544

[22] Filed: Mar. 6, 1998

[30] Foreign Application Priority Data

Mar. 7, 1997 [DE] Germany .............................. 197 09 545

[51] Int. Cl.⁷ ..................................................... H01H 47/00
[52] U.S. Cl. ............................................ 307/125; 307/131
[58] Field of Search ..................................... 307/100, 116, 307/126, 127, 125, 130, 131, 149, 157; 315/46, 47, 74, 75, 119, 125, 207, 208, 209, 310, 247, 248; 323/220; 324/126

[56] References Cited

U.S. PATENT DOCUMENTS

| | | | |
|---|---|---|---|
| 4,553,070 | 11/1985 | Sairanen et al. | 315/209 |
| 4,647,820 | 3/1987 | Chermin et al. | 315/245 |
| 4,935,672 | 6/1990 | Lammers et al. | 315/200 |
| 4,949,016 | 8/1990 | De Bijl et al. | 315/208 |
| 5,075,599 | 12/1991 | Overgoor et al. | 315/224 |
| 5,134,344 | 7/1992 | Vos et al. | 315/239 |
| 5,172,033 | 12/1992 | Smits | 315/224 |
| 5,243,261 | 9/1993 | Bergervoet et al. | 315/248 |
| 5,311,102 | 5/1994 | Du | 315/205 |
| 5,543,690 | 8/1996 | Bernicke et al. | 315/224 |
| 5,796,214 | 8/1998 | Nerone | 315/209 |
| 5,831,396 | 11/1998 | Rudolph | 315/307 |
| 5,838,117 | 11/1998 | Nerone | 315/307 |

*Primary Examiner*—Stephen W. Jackson
*Assistant Examiner*—Peter Zura
*Attorney, Agent, or Firm*—Carlo S. Bessone

[57] ABSTRACT

A circuit arrangement for operating a load, in which in normal operation the control energy for activating the switching element or switching elements ($T_a$, $T_b$) is obtained from the energy content of the freewheeling current antiparallel relative to this switching element, and the ON duration is determined by the time constants of control energy storage elements which are assigned to the switching elements, or by the storage time of bipolar transistors.

24 Claims, 18 Drawing Sheets

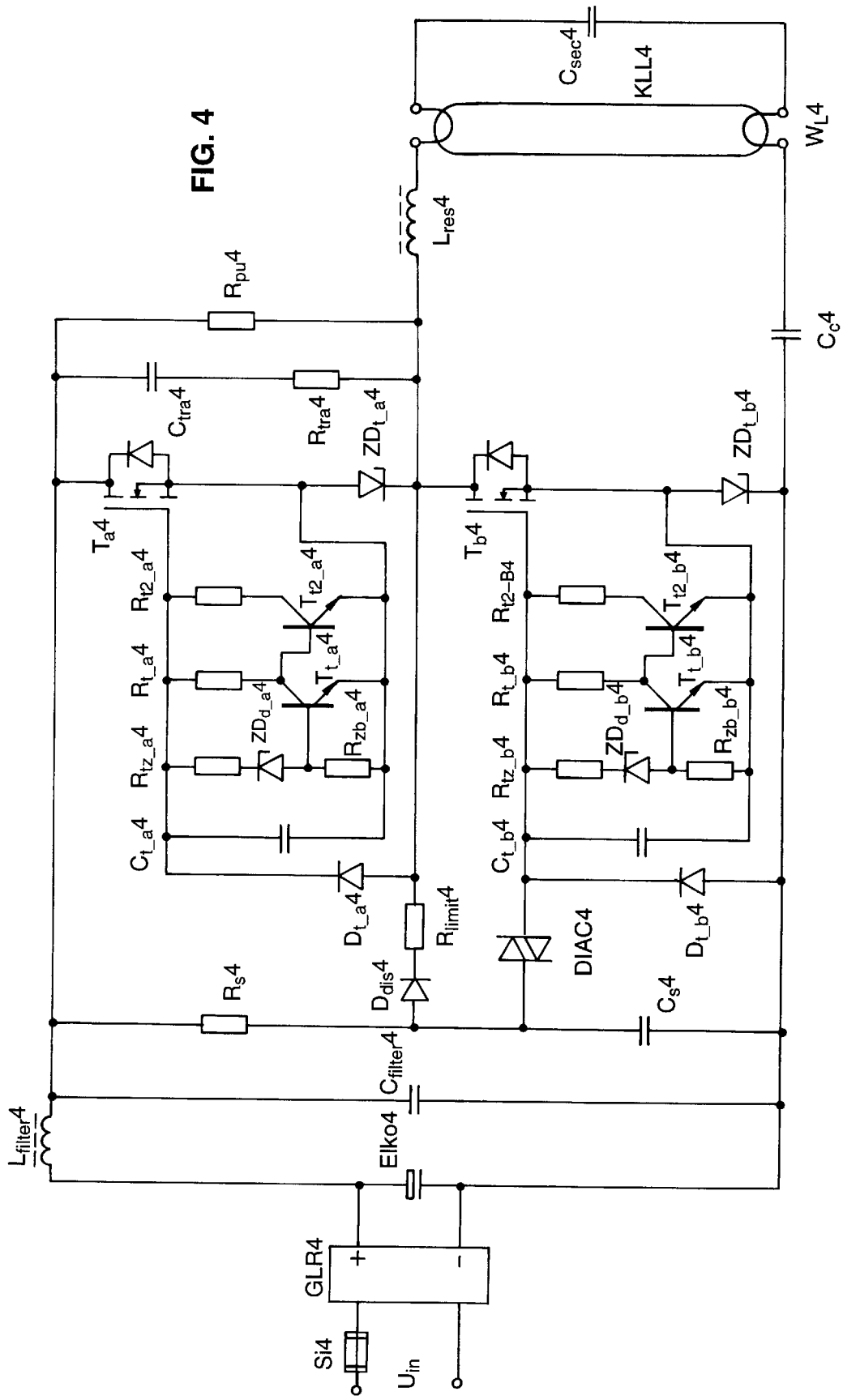

SWITCHING CONTROL OF AN OPERATING CIRCUIT

BACKGROUND OF THE INVENTION

The invention relates to a circuit for operating a load such as, for example, a low-pressure discharge lamp.

At issue, in particular, is an operating circuit for power ranges of up to a few tens of Watts, in which centre stage is occupied first and foremost by costs, for example small power supply units and, in particular, also electronic ballasts (EB) for compact fluorescent lamps (KLL).

In such circuits, the switching elements have to be supplied with a driving power in step with the operating frequency. For this purpose, the known arrangements make use of separate current transformers, as shown in the book entitled "Elektronikschaltungen" ("Electronic circuits") by W. Hirschmann (Siemens AG, 1982) on pages 148 and 150, for example, or, via booster windings on the resonance reactor or the power transformer, they tap control energy which they reshape appropriately in a pulse shaping and phase shifter network (see German Offenlegung DE 41 29 430). It is also possible, of course, to use frequency or pulse width control, preferably integrated in a control IC.

However, a disadvantage in such controls is the outlay in the form of dedicated winding materials or additional windings on existing inductors, or of complicated and expensive control ICs with an auxiliary power supply etc.; said outlay greatly influences the costs precisely in the case of low powers since, by contrast with the power elements, the cost of control is virtually exactly as high as for a few hundred Watts even in the case of a transmitted power of only a few Watts.

The invention is based on the technical problem of improving the circuit specified at the beginning with regard to simpler and more cost-effective production.

SUMMARY OF THE INVENTION

The invention proceeds from the idea of using as energy source for controlling the switching element into the conducting state the freewheeling current which, during the non-conducting state of the switching element, flows anti-parallel to the current through the switching element in its conducting state. This can be performed by virtue of the fact that the path of the freewheeling current, for example via a freewheeling diode, is blocked and, for example, that across a Zener diode inserted into the freewheeling section a voltage drop is generated which is then, as a stimulating pulse of the length of the freewheeling period and of the level of the Zener voltage, delayed in decaying via a current storage or charge storage element for as long as the activation of the switching element parallel to the freewheeling diode is to last.

However, in the case of this invention it is possible in different ways—as shown below by way of explanation—to use the freewheeling current, which is present in any case in the operating circuit with a power-switching element, in a skilful, that is to say simple and cost-effective way to control the power-switching element or else elements.

Although the term "energy" stands here in general on the one hand for the physical quantity of "energy", it also stands moreover as a substitute for, for example, the voltage for controlling an FET, for a current or a charge for controlling a bipolar transistor etc. In any case, the electric quantity suitable for driving a power-switching element can be obtained from the freewheeling current as in the exemplary embodiments or in another way known to the person skilled in the art.

The applicability of the control shown for the switching elements is, of course, not restricted to half bridges and EB—it can also be used for full bridges, push-pull transformers, as well as single-ended converters such as single-transistor arrangements or asymmetrical half bridges.

The load need not necessarily be inserted into a series resonant circuit, it can also be coupled in by transformer with rectification on the secondary side, as is usual in the case of power supply units.

Instead of the simple rectifier circuit with filtering as input circuit, a combination having circuits for reducing line current harmonics is also possible.

P-channel or pnp switching transistors—also in combination with the N-channel or npn switching transistors used below here—also come into consideration as switching elements.

Of course, it is also possible for different embodiments, such as those set forth below by way of example, to be combined with one another.

It is essential only that before the activation of the switching element or elements a freewheeling phase exists through a freewheeling section acting in an anti-parallel fashion, for example a freewheeling diode situated in an anti-parallel fashion.

When a transformer is used to couple in a load such as a secondary rectifier circuit or a low-voltage halogen lamp without an inductor connected in series therewith (except for a leakage inductance which is present in a parasitic fashion but held low), the current to be applied for a sufficient freewheeling phase can be stored in an inductor parallel to the load. In order to avoid an additional inductor, it is also possible for this purpose to design the transformer with an air gap in order, by means of the magnetization current increased in this way, to ensure a sufficient freewheeling current after a switching element is turned off.

However, the following exemplary embodiments centre on half bridges with a series resonant circuit, since they are very suitable for use in EB for KLL.

In order to illustrate various possibilities of circuitry in the region of the lamp and the resonant circuit, the various exemplary embodiments are also of different configuration in this region. However, this is not necessarily related to the differences between the respective freewheeling control circuits according to the invention, rather, these variants can be combined arbitrarily in practice; their representation by way of example serves the purpose of explaining that the subject-matter of the invention is not restricted to special circuitry outside the freewheeling control circuit.

BRIEF DESCRIPTION OF THE DRAWINGS

FIG. 4 is circuit for operating a load in accordance with another embodiment of the invention;

FIG. 7b is partial diagram showing a 3-pin module for use in the circuit of FIG. 7a;

FIG. 7d is partial diagram showing a 3-pin module for use in the circuit of FIG. 7a;

DETAILED DESCRIPTION OF THE INVENTION

A description is given below of the functioning of the circuit with the aid of an EB for a KLL of 15 W in the form of a resonant half-bridge circuit with MOSFET switching transistors (for short: FET), which operate as no-volt switches. Instead of the FET, it is also possible in FIGS. 1 to 9 to use an IGBT (Isolated Gate Bipolar Transistor, a combination of MOSFET and bipolar transistor) with appropriate loadability in terms of voltage and current.

Figure 1:
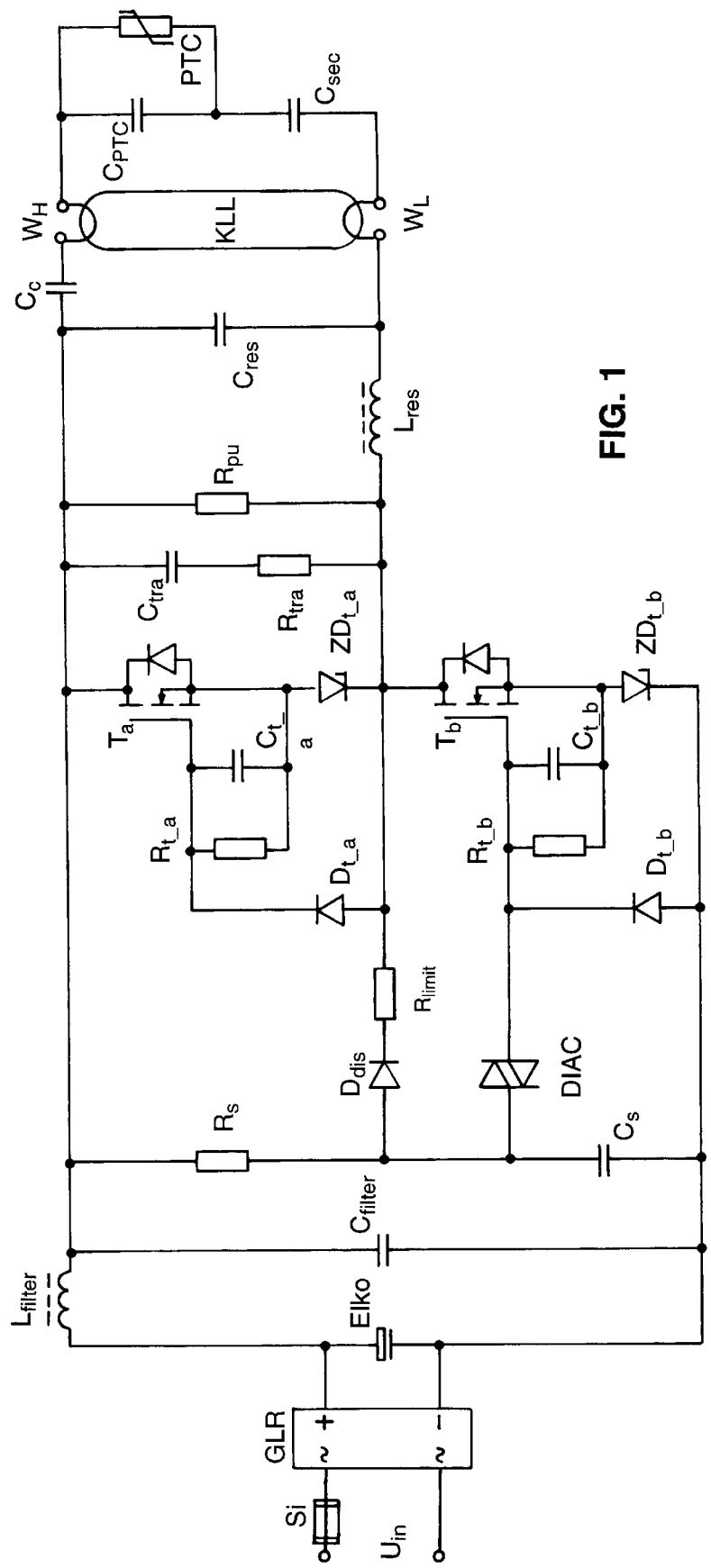
FIG. 1 is a circuit for operating a load in accordance with the teachings of the present invention.

In FIG. 1, the AC voltage of the supply network is applied via a fuse Si to the rectifier GLR, and the DC voltage, generated thereby, is smoothed with the aid of an electrolytic capacitor Elko. This input part can be eliminated in the case of feeding exclusively from a DC voltage source, such as a battery. A sufficiently good radio interference suppression of the overall arrangement can be achieved by means of a bar-core inductor $L_{filter}$ and a downstream foil capacitor $C_{filter}$.

After application of the supply voltage, the first step is to use a high-value resistor $R_s$ to charge a starting capacitor $C_s$ from the supply voltage in order to generate an initial starting pulse by means of a monoflop function. At the same time, a favorable initial position for starting in the case of, for example leakage currents of the lower transistor $T_b$, or for reproducing the initial position after a failed starting attempt can be created by a pull-up resistor $R_{pu}$ parallel to the upper transistor $T_a$. As soon as the voltage across the starting capacitor reaches the threshold voltage of the DIAC plus the forward voltage of the lower Zener diode $ZD_{t\_b}$, said DIAC switches through and discharges a portion of the charge of $C_s$ into the gate capacitor $C_{t\_b}$ of $T_b$, as a result of which $T_b$ becomes active for the first time and a resonance oscillation begins in the load circuit. At the same time, $T_b$ also begins to discharge $C_s$ via the discharge diode $D_{dis}$ and the limiting resistor $R_{limit}$.

If $R_{limit}$ were not present, $T_b$ would already completely discharge the starting capacitor $C_s$ via $D_{dis}$ shortly after exceeding its threshold value, and in this way only approximately 4V would be stored in $C_{t\_b}$. It is true that in the case of an EB with current transformer control, for example, the resonant current which begins would immediately act to produce positive feedback, and thereby build up still reliably even in the case of a weak initial drive. However, the first pulse must here approximate in magnitude and duration the control signals generated later by the freewheeling, since no further instances of positive feedback provide control energy from the circuit.

Beginning with the end of the DIAC pulse, $C_{t\_b}$ is discharged via $T_{t\_b}$, and $T_b$ turns off after undershooting the threshold voltage. A current is already impressed in the resonance inductor $L_{res}$. It has been flowing during activation of $T_b$ in the EB circuit shown with preheating from the positive supply in parallel via $C_{res}$ as also through the series circuit composed of the decoupling capacitor $C_c$, the upper filament $W_H$ of the KLL, the PTC thermistor PTC parallel to the capacitor $C_{PTC}$, the capacitor $C_{sec}$, the lower filament $W_L$ of the KLL to the node with $C_{res}$, via $L_{res}$, $T_b$ and $ZD_{t\_b}$ to the negative supply.

After $T_b$ has been switched off, the trapezoidal capacitor $C_{tra}$ is first recharged via a damping resistor $R_{tra}$ before the current impressed in $L_{res}$ seeks a freewheeling path via the freewheeling diode contained in $T_a$. $R_{tra}$ suppresses radio-frequency oscillations in the present setup and is not mandatory. However, the path of the freewheeling current is blocked by the Zener diode $ZD_{t\_a}$ inserted into the source line of $T_a$ with the result that it must flow via the diode $D_{t\_a}$ and the parallel circuit composed of $C_{t\_a}$ and $R_{t\_a}$ and charges $C_{t\_a}$ in the process before it reaches the node of $C_{res}$ and $C_c$ via the transistor-anti-parallel freewheeling diode. As soon as the voltage in $C_{t\_a}$ corresponds to the Zener voltage of $ZD_{t\_a}$ minus the forward voltage of $D_{t\_a}$, $ZD_{t\_a}$ becomes conducting, and the voltage across $C_{t\_a}$ is not further increased. The transistor $T_a$ is already turned on without loss (since in a deenergized fashion) during the freewheeling phase of its freewheeling diode connected to it in an anti-parallel fashion.

The freewheeling phase ends after the energy impressed in $L_{res}$ has been consumed. $C_{t\_a}$ begins to discharge through $R_{t\_a}$, and the current can oscillate back through $T_a$ and $ZD_{t\_a}$ (not now any longer in the Zener direction but in the forward direction) sinusoidally via $L_{res}$ and the parallel circuit composed of $C_{res}$ and the series circuit composed of the elements $W_L$, $C_{sec}$, PTC with $C_{PTC}$, $W_H$ and, finally, $C_{sec}$, until $R_{t\_a}$ has decreased the voltage across $C_{t\_a}$ below the gate threshold voltage of $T_a$ and $T_a$ turns off. The source of energy for this backward oscillation is the energy stored in the previous $T_b$ cycle in $C_{res}$ as well as $C_c$ and $C_{sec}$ (not in $C_{PTC}$, since short-circuited in a low-resistance fashion by the PTC). The $C_{tra}$ provided for reducing turn-off losses is now recharged again, before the current impressed in $L_{res}$ now finds its freewheeling path, blocked by $ZD_{t\_b}$, from the negative supply to the positive supply via $D_{t\_b}$, the parallel circuit composed of $C_{t\_b}$ and $R_{t\_b}$, the body diode antiparallel to $T_b$ (that is to say the diode which for technical reasons is intrinsic relative to the transistor) and, finally, via the voltage-generating $L_{res}$ and the resonance capacitors or the filaments. If the voltage in $C_{t\_b}$ now reaches the value of the Zener voltage of $ZD_{t\_b}$ minus the forward voltage of $D_{t\_b}$, $ZD_{t\_b}$ is turned on and limits the voltage across $C_{t\_b}$. As already with $T_a$, $T_b$ is also turned on with the start of the freewheeling phase. The current through $T_b$ and $ZD_{t\_b}$ starts to oscillate positively, and $C_{t\_b}$ is discharged again via $R_{t\_b}$ until the threshold voltage is undershot and $T_b$ is turned off anew.

The oscillation continues half cycle by half cycle in the way described, and the current flowing via the filaments and the PCT thermistor ensures preheating of the filaments and heating up of the PCT thermistor above the breakover temperature of the latter. Since the PTC thermistor now acquires a high resistance and now scarcely short circuits $C_{PTC}$ any more, the pole point of the overall resonant circuit is displaced to a higher frequency—nearer to that generated by the half bridge, as a result of which the fundamental wave contained in the trapezoidal oscillation of the half bridge more strongly excites the resonant circuit, generates a high voltage across the lamp and thereby starts the latter. The now burning lamp damps the resonant circuit; the oscillation continues nevertheless as long as sufficient freewheeling energy is available for control.

By contrast with a current transformer controller or a phase shifter controller, during the preheating, starting and operating phases the operating frequency remains virtually identical (if no elements, for example additional resistors, are introduced into the source line). A small modulation is produced by trapezoidal capacitor recharging times of different length and by freewheeling phases of different length owing to the cyclic variations in the DC supply voltage (electrolytic capacitor hum), since the half-cycle period is formed from the $C_{tra}$ recharging time plus the freewheeling time plus the discharging time of $C_t$ ($C_{t\_a}$ or $C_{t\_b}$) via $R_t$ ($R_{t\_a}$ or $R_{t\_b}$) from the initial value $ZD_t$ voltage minus the $D_t$ forward voltage down to below the gate threshold voltage. The design of the components—in particular of the capacitors in parallel with the load—must ensure in all operating phases that a satisfactory freewheeling current is impressed in $L_{res}$, since otherwise the oscillation stalls and must be restarted by the DIAC.

A disadvantage of the circuit shown in FIG. 1 is that the exponential discharging of $C_t$ through $R_t$ turns off the FET very slowly, since firstly the linear region of the FET characteristic with the channel resistance $R_{DSon}$, which is high in the final phase is traversed, until it is finally depleted by $R_t$ and turned off.

It is not possible to select $R_t$ with an arbitrarily low resistance, since otherwise it would be necessary in the case of a desired time constant to select $C_t$ to be so large that the freewheeling current no longer suffices in all operating phases for completely charging $C_t$. However, a large part of the turn-off losses can be avoided by suitable design of $C_{tra}$.

The forward losses are therefore particularly disadvantageous towards the end of the ON period, when the gate voltage is so low that the FET is operated in the linear region. The main aim of the embodiments shown in FIG. 2, FIG. 3, FIG. 4, FIG. 5 and FIG. 7 is to overcome this disadvantage.

Figure 2:
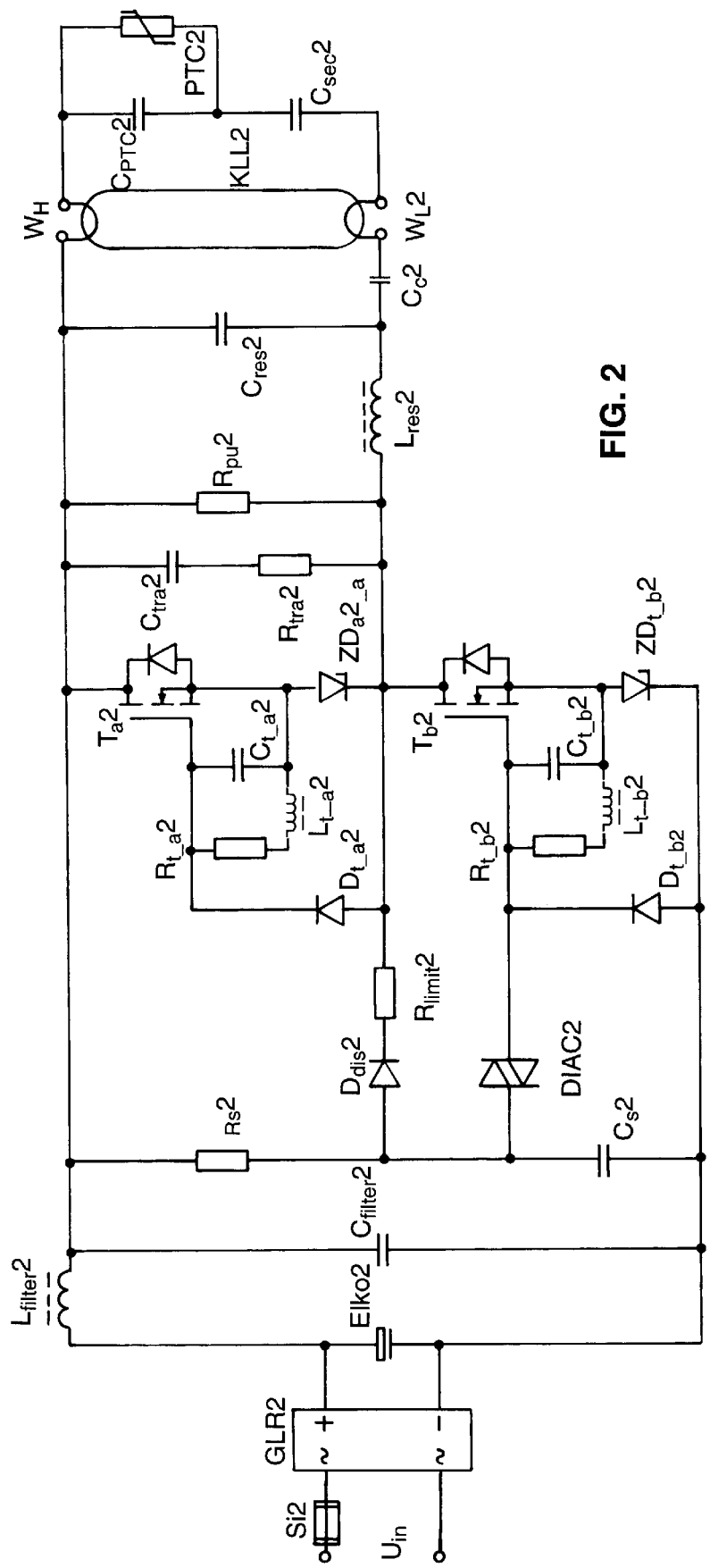
FIG. 2 is circuit for operating a load in accordance with another embodiment of the invention.

In addition to the discharge resistor $R_t$ ($R_{t\_a}2$ or $R_{t\_b}2$), in FIG. 2 a discharge inductor $L_t$ ($L_{t\_a}2$ or $L_{t\_b}2$) is inserted in series, as a result of which $C_t$ ($C_{t\_a}2$ or $C_{t\_b}2$) is discharged in a damped oscillation and as a result the gate voltage traverses the linear region of the transistor only in a shorter time interval of the duration of the half period than in the embodiment of FIG. 1. A very small and cost-effective design, for example a BC inductor suffices as discharge inductor. In the embodiment shown, a very strong damping is selected with $R_t=470\Omega$, in order to suppress post-pulse oscillation of the resonant circuit composed of $C_t$ and $L_t$. However, the damping can also be smaller.

Furthermore, the decoupling capacitor $C_c2$ is arranged not, as in FIG. 1, between the positive supply and the lamp, but between $L_{res}2$ and $W_L2$.

Figure 3:
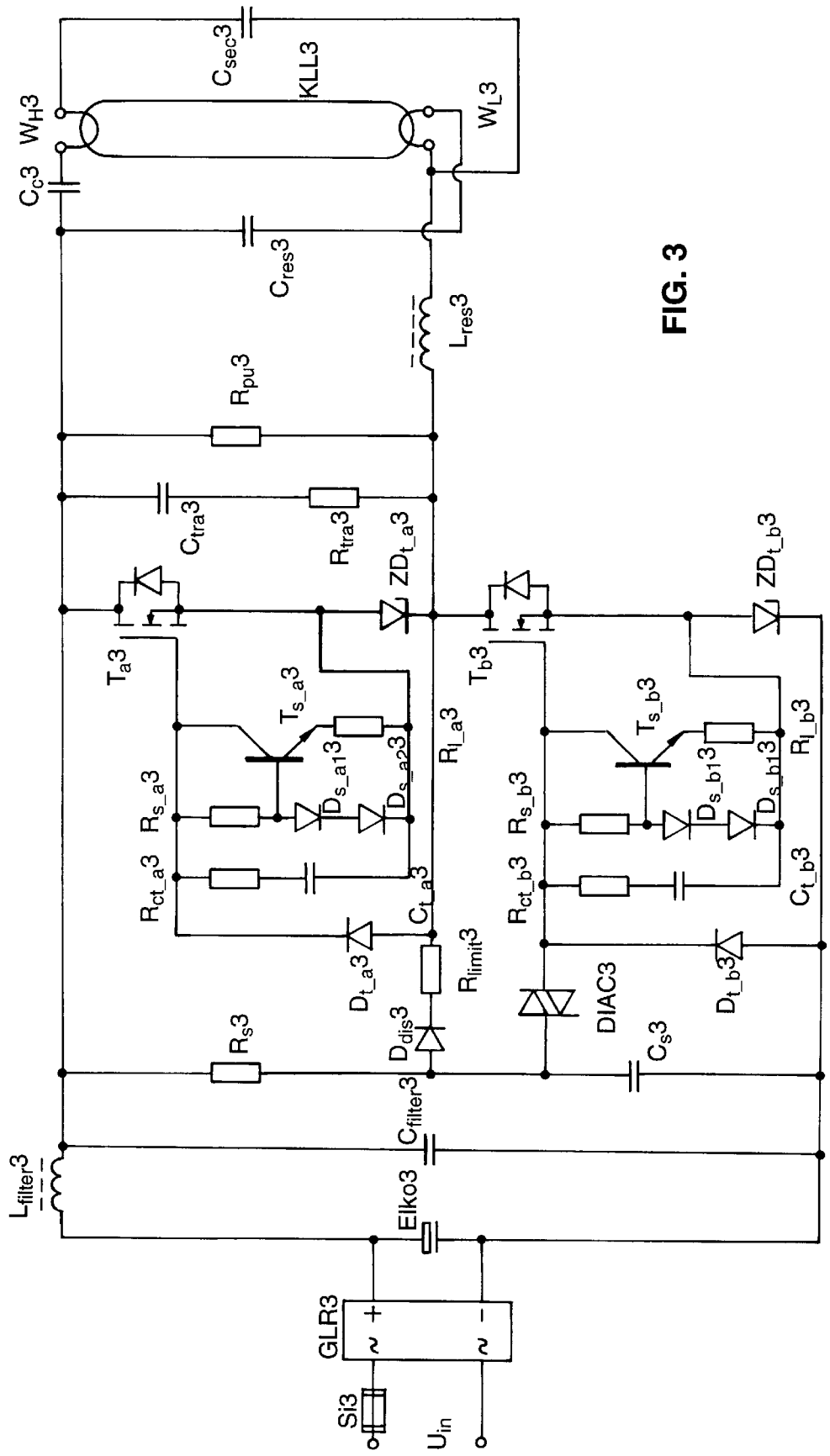
FIG. 3 is circuit for operating a load in accordance with another embodiment of the invention.

Selected in FIG. 3 instead of a simple discharge resistor $R_t$ ($R_{t\_a}3$ or $R_{t\_b}3$) is a discharge of $C_t$ ($C_{t\_a}3$ or $C_{t\_b}3$) through a constant current sink which generates a discharge curve of $C_t$ in the form of a falling straight line, and is thus more favorable than the exponential discharge curve of a simple resistor $R_t$. The constant current sink is formed, for example, by the transistor $T_s$ ($T_{s\_a}3$ or $T_{s\_b}3$), the resistors $R_s$ ($R_{s\_a}3$ or $R_{s\_b}3$) and $R_l$ ($R_{l\_a}3$ or $R_{l\_b}3$) and the series circuit composed of the diodes $D_{s\_a1}3$ or $D_{s\_b1}3$ and $D_{s\_a2}3$ or $D_{s\_b2}3$.

Furthermore, the PTC thermistor for preheating the filaments is dispensed with in FIG. 3, and a cold start is selected, the resonance capacitor $C_{res}3$ here supplying the filament $W_L3$ with current, and the resonance capacitor $C_{sec}3$ supplying the filament $W_H3$ with current.

A switchable time constant is now proposed in FIG. 4, the initially fully charged capacitor $C_t$ ($C_{t\_a}4$ or $C_{t\_b}4$) at first being discharged in a high-resistance fashion through the parallel discharge sections composed of a first series circuit of $R_{tz}$ ($R_{tz\_a}4$ or $R_{tz\_b}4$), the Zener diode $ZD_d$ ($ZD_{d\_a}4$ or $ZD_{d\_b}4$) and the base of a first small-signal transistor $T_t$ ($T_{t\_a}4$ or $T_{t\_b}4$), as well as a second series circuit composed of a resistor $R_t$ ($R_{t\_a}4$ or $R_{t\_b}4$) and the turned-on collector-emitter path of $T_t$. As soon as the voltage across $C_t$ falls below the threshold composed of the Zener voltage of $ZD_d$ plus the base-emitter threshold voltage of $T_t$, the resistor $R_t$ ($R_{t\_a}4$ or $R_{t\_b}4$) turns on a second small-signal transistor $T_{t2}$ ($T_{t2\_a}4$ or $T_{t2\_b}4$) which switches over to a second time constant that is comparatively short with reference to the first one (for example 10% of the first one) and quickly discharges the remainder of the charge of $C_t$ as also the transistor capacitances via $R_{t2}$ ($R_{t2\_a}4$ or $R_{t2\_b}4$). The phase in which the FET is operated linearly is therefore traversed very quickly, and the current dropping time of the drain current is also greatly shortened.

Furthermore, the additional "primary-side" resonance capacitor $C_{res}$ is dispensed with, and the entire lamp-parallel capacitance required is combined in $C_{sec}4$. This is possible without any problem as long as the filaments $W_H4$ and $W_L4$ are not of excessively resistance. Furthermore, the lamp is connected not to the positive supply but, in series with the decoupling capacitor $C_c4$, to the negative supply.

Figure 5A:
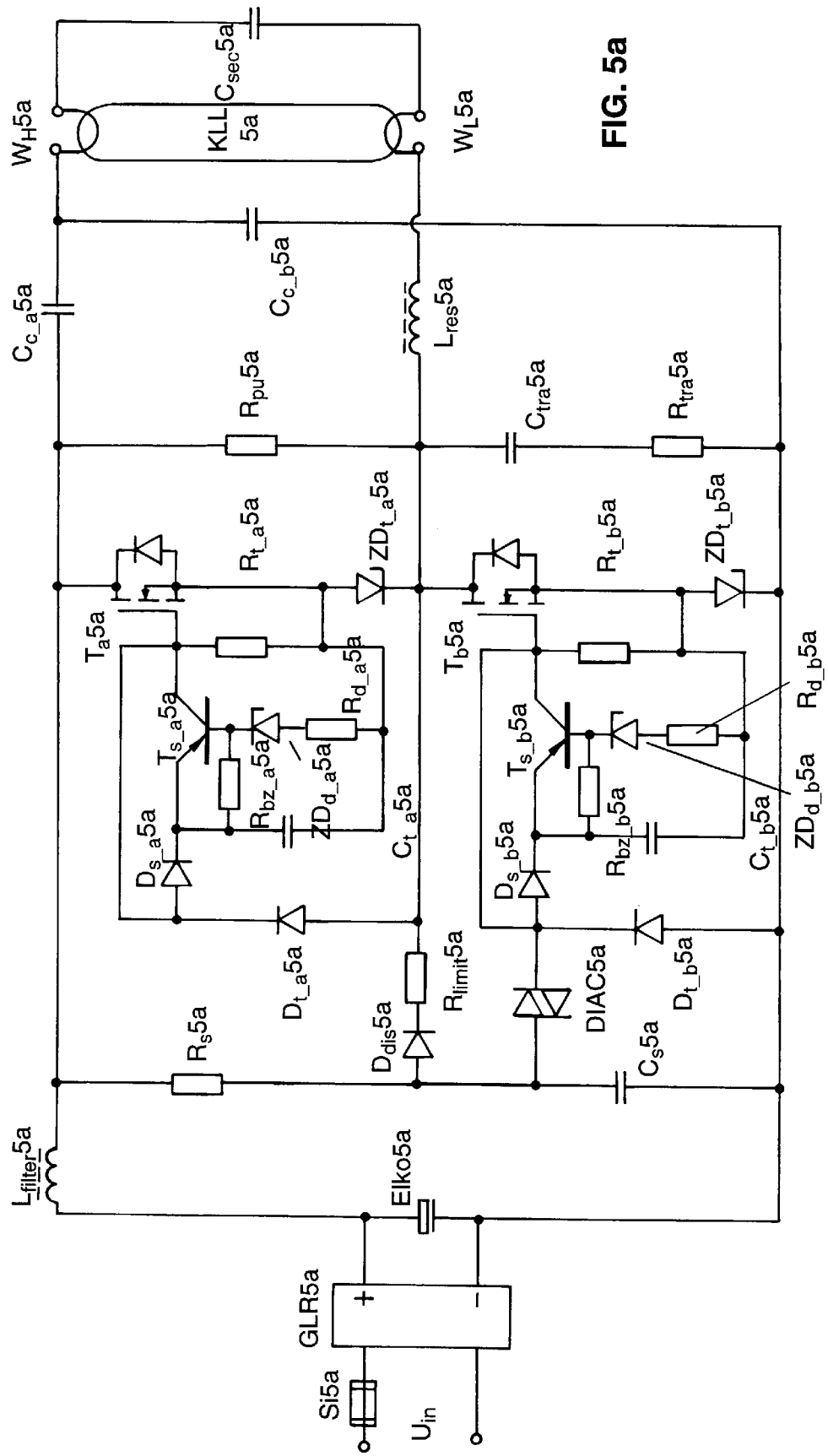
FIG. 5a is circuit for operating a load in accordance with another embodiment of the invention.
Figure 5B:
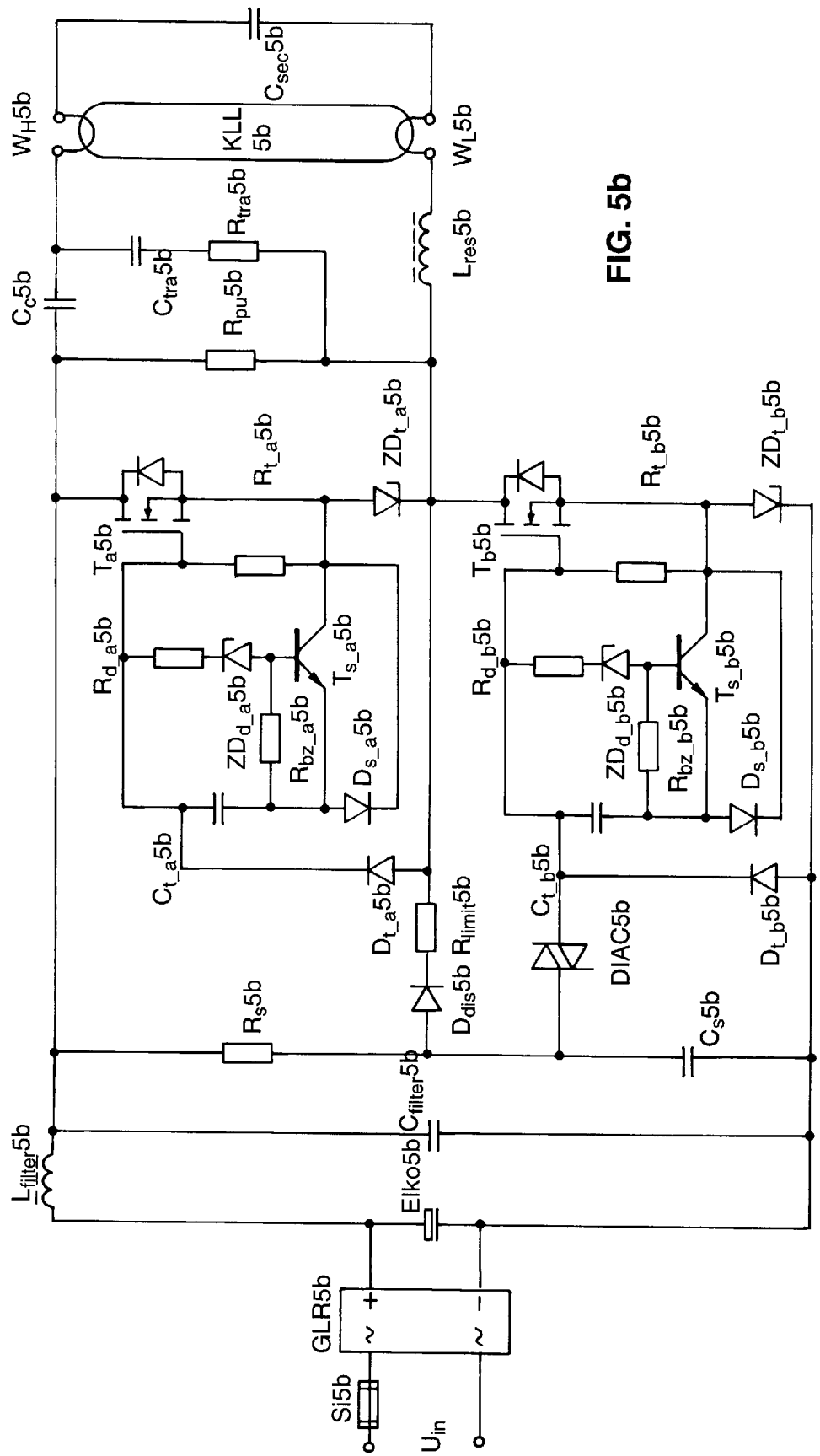
FIG. 5b is circuit for operating a load in accordance with another embodiment of the invention.

The circuits in FIG. 5a and FIG. 5b achieve a similar waveform of the gate voltage as in FIG. 4, except that instead of switching in a low-resistance discharge resistor in order to switch over the time constant, the capacitor $C_t$ is disconnected starting from a specific voltage threshold, as a result of which near the end of the ON duration of $T_a/T_b$ the time constant comprises only $R_t$ ($R_{t\_a}5a$ or $R_{t\_b}5a$) and the comparatively small internal capacitances of the FET.

In this case, in FIG. 5a the charging current of $C_t$ ($C_{t\_}5a$ or $C_{t\_b}5a$) is conducted via an additionally inserted small-signal diode $D_s$ ($D_{s\_a}5a$ or $D_{s\_b}5a$) which blocks in the discharging direction of $C_t$. As long as the voltage across $C_t$ is higher than the prescribable Zener voltage of the Zener diode $ZD_d$ ($ZD_{d\_a}5a$ or $ZD_{d\_b}5a$) plus the emitter-base voltage of the pnp small-signal transistor $T_s$ ($T_{s\_a}5a$ or $T_{s\_b}5a$), this small-signal transistor is turned on and permits discharging of $C_t$ via its emitter-collector path and $R_t$ ($R_{t\_a}5a$ or $R_{t\_b}5a$). If the voltage of $C_t$ falls below this threshold, $C_t$ cannot be further discharged, and is disconnected from the gate by the now blocking $T_s$ and also the blocking $D_s$, as a result of which $R_t$ need only discharge the FET input capacitance, and thus the linear operating range is traversed more quickly (approximately 600 ns). In the case when the gate voltage drops below the threshold voltage, the plateau has a duration of approximately 400 ns, the pure dropping time of the drain current being approximately 100 ns in the case of the subassembly dimensioning shown, and is thus satisfactorily quick.

Furthermore, symmetric decoupling is undertaken in FIG. 5a via the coupling capacitors $C_{c\_a}5a$ and $C_{c\_b}5a$. If the latter are large enough, their serial effect between the positive supply and negative supply replaces the filter capacitor $C_{filter}$, as a result of which the number of components is not increased by the symmetrical decoupling. The series circuit composed of $C_{tra}5a$ and $R_{tra}5a$ is connected in this exemplary embodiment from the half-bridge centre point to the negative supply.

In FIG. 5b, the negative lead of $C_t(C_{t\_a}5b$ or $C_{t\_b}5b)$ is interrupted in order to be able to use an npn small-signal transistor $T_s$ ($T_{s\_a}5b$ or $T_{s\_b}5b$). However, the effect is equivalent to that in FIG. 5a.

Of course, the circuits of FIG. 3 and FIG. 4 can also be constructed with pnp transistors or with FETs or integrated current sinks, or be otherwise dimensioned. Furthermore, in FIG. 5b the series circuit composed of $C_{tra}5b$ and $R_{tra}5b$ is connected from the half-bridge centre point to the node of $C_c5b$ and $W_H5b$.

Figure 6:
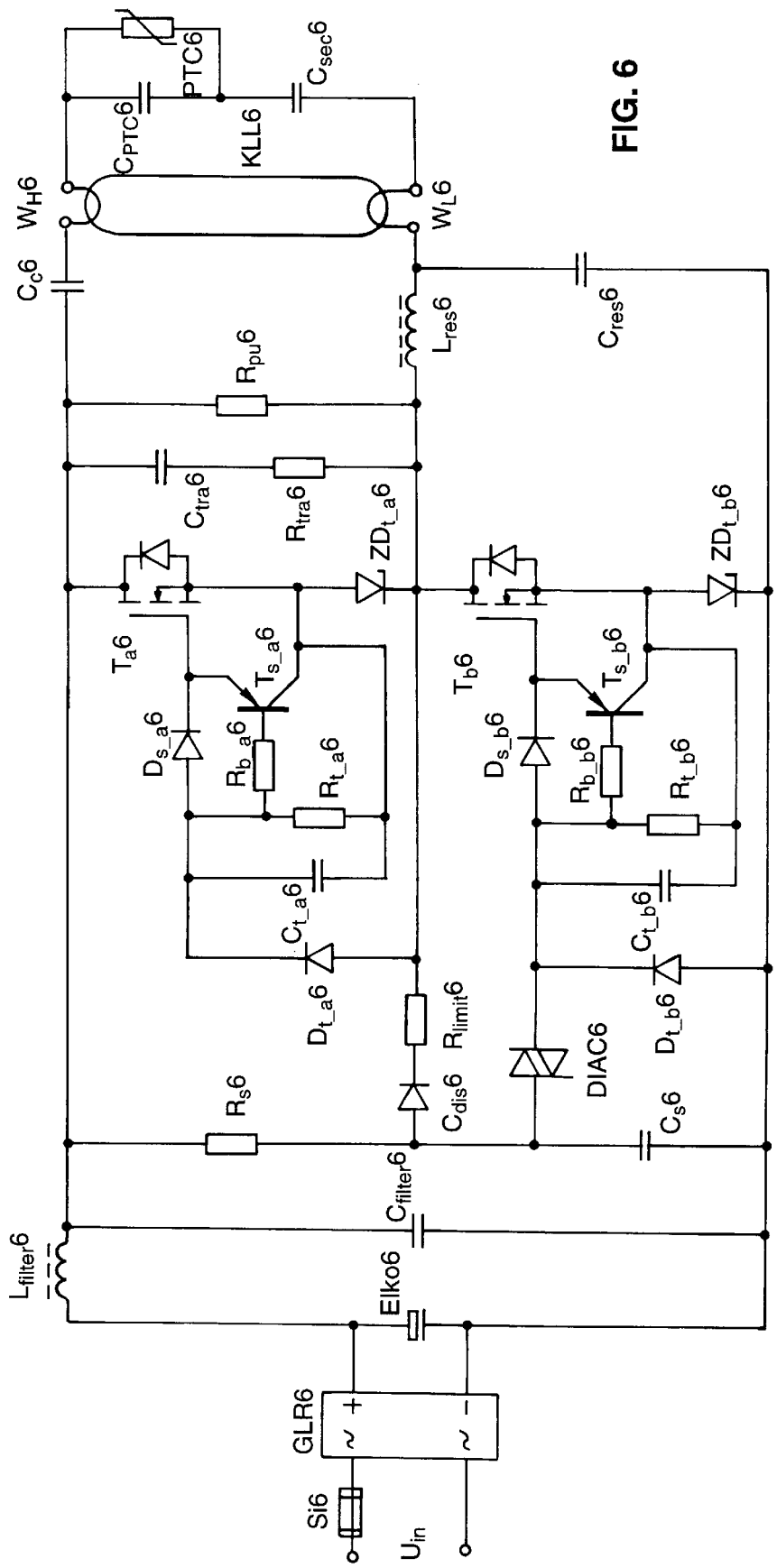
FIG. 6 is circuit for operating a load in accordance with another embodiment of the invention.

Set forth in FIG. 6 is a turn-off accelerating system according to the prior art which, be addition, can also be inserted between $C_t$ and the gate of the FET in all the previous embodiments in order to reduce the turn-off losses. For this purpose, the gate of the FET is charged via the small-signal diode $D_{s\_a}6$ or $D_{s\_b}6$, but the discharging is performed via the pnp small-signal transistor $T_{s\_a}6$ or $T_{s\_b}6$, whose base is connected to the anode of $D_{s\_a}6$ or $D_{s\_b}6$ via the resistor $R_{b\_a}6$ or $R_{b\_b}6$. The duration of the gate voltage plateau and the drain current dropping time can thus be effectively shortened, but the same is not true of the traversal of the linear operating range of the FET.

Furthermore, although in FIG. 6 the lamp is connected to the positive supply via $C_c6$, the resonance capacitor $C_{res}6$ is connected to the negative supply.

Figure 7A:
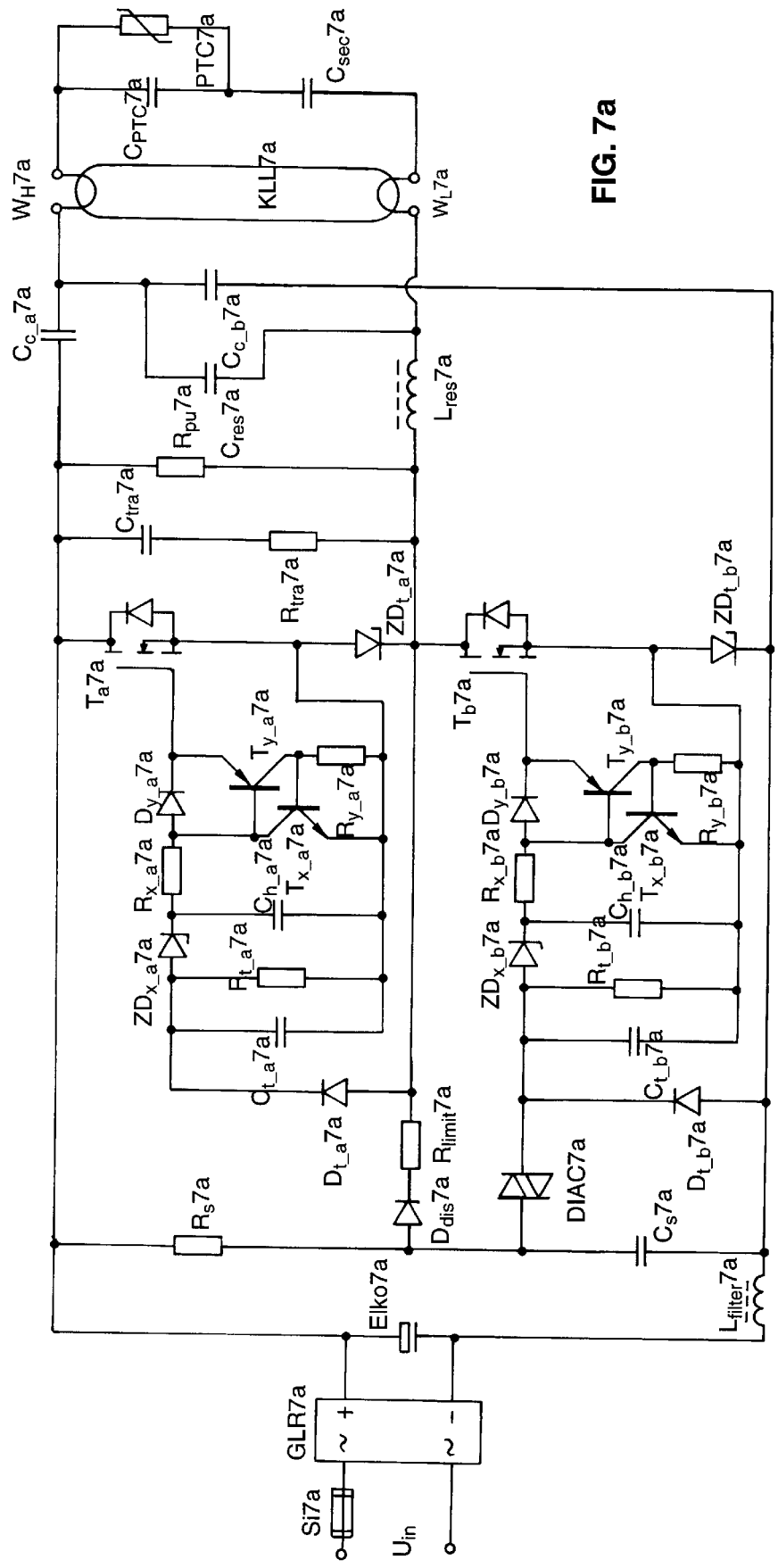
FIG. 7a is circuit for operating a load in accordance with another embodiment of the invention.

In the embodiment of FIG. 7a, the gate of the FET T ($T_a7a$ or $T_b7a$) is decoupled from the voltage characteristic at $C_t$ ($C_{t\_a}7a$ or $C_{t\_b}7a$) parallel to $R_t$ ($R_{t\_a}7a$ or $R_{t\_b}7a$). For this purpose, the voltage of $C_t$ is charged via a first diode $ZD_x$ ($ZD_{x\_a}7a$ or $ZD_{x\_b}7a$), here preferably constructed as a Zener diode in the forward direction, into a small auxiliary capacitor $C_h$ ($C_{h\_a}7a$ or $C_{h\_b}7a$). However, this is required only because of the reverse recovery time of $ZD_x$. The control voltage is then handed to the gate of the FET via a (relatively low-resistance) current-limiting resistor $R_x$ ($R_{x\_a}7a$ or $R_{x\_b}7a$) and a further diode $D_y$ ($D_{y\_a}7a$ or $D_{y\_b}7a$). A pnp small-signal transistor $T_y$ ($T_{y\_a}7a$ or $T_{y\_b}7a$) and an npn small-signal transistor $T_x$ ($T_{x\_a}7a$ or $T_{x\_b}7a$) form a thyristor structure which can be fired from the base of the pnp transistor as soon as the voltage across $C_t$ has dropped below the gate voltage by the Zener voltage of $ZD_x$ plus the emitter-base voltage of $T_y$.

The resistor $R_y$ ($R_{y\_a}7a$ or $R_{y\_b}7a$) between the base and emitter of the npn transistor $T_x$ and, above all, the further diode $D_y$ from the base to the emitter of the pnp transistor $T_y$ prevent "overhead firing" of the thyristor structure by the steep voltage rise caused by the freewheeling current in $C_t$. $C_h$ provides the reverse recovery current of $ZD_x$, in order not already to fire the thyristor structure given a small drop in the voltage across $C_t$ through this reverse recovery current of $ZD_x$. After being fired, the thyristor thus formed discharges the gate directly, as well as $C_t$ and $C_h$ via $R_x$.

The circuit generates at the gate of the FET a virtually square-wave voltage characteristic, since the first Zener diode $ZD_x$ has a decoupling effect, and turns off very quickly (a drain current dropping time of 10 ns is achieved with the specified dimensioning).

A frequency rise, and thus power decrease can be achieved in the case of high ambient temperatures (similar to the ferrite selection in the case of driving by a saturable current transformer) by the selection of a Zener diode region with a negative temperature coefficient.

Furthermore, symmetrical decoupling is selected again in FIG. 7a by means of the coupling capacitors $C_{c\_a}7a$ and $C_{c\_b}7a$ and $C_{filter}$ is dispensed with, here $C_{res}7a$ being positioned between the node of $L_{res}7a$ and $W_L7a$ and the node of $C_{c\_a}7a$, $C_{c\_b}7a$ and $W_H7a$, and the filter inductor $L_{filter}7a$ having been connected into the negative line of the supply.

Figure 7B:
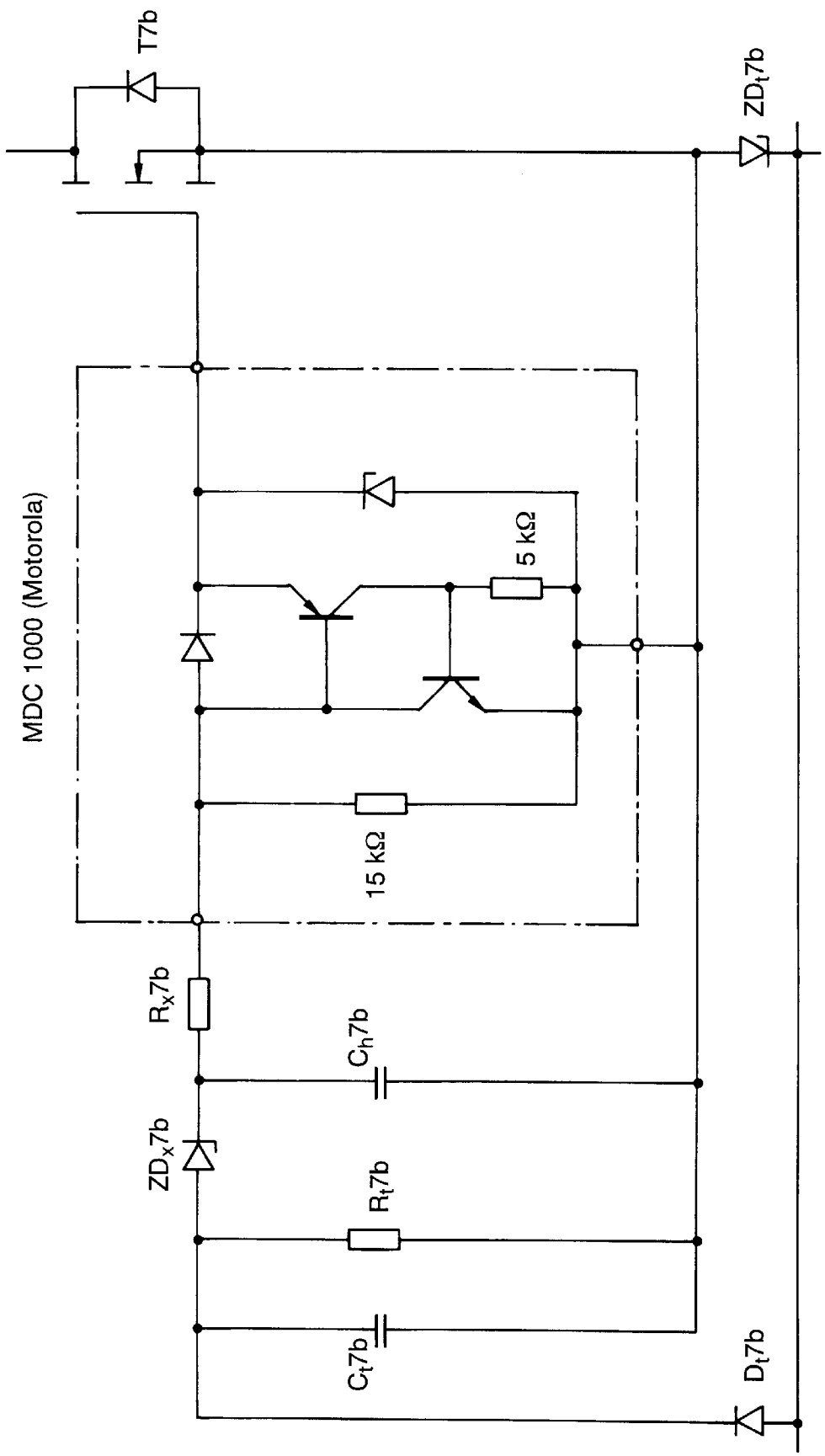

A thyristor structure is already contained in the (simple and cost-effective) 3-pin module MDC1000 from Motorola and can—see FIG. 7b—be used to reduce the number of subassemblies. The internal resistance of 15 kΩ in the module MDC1000 naturally forms with $C_h7b$ a second, unwanted time constant, which must be conspicuously larger than $C_t7b * R_t7b$.

Figure 7C:
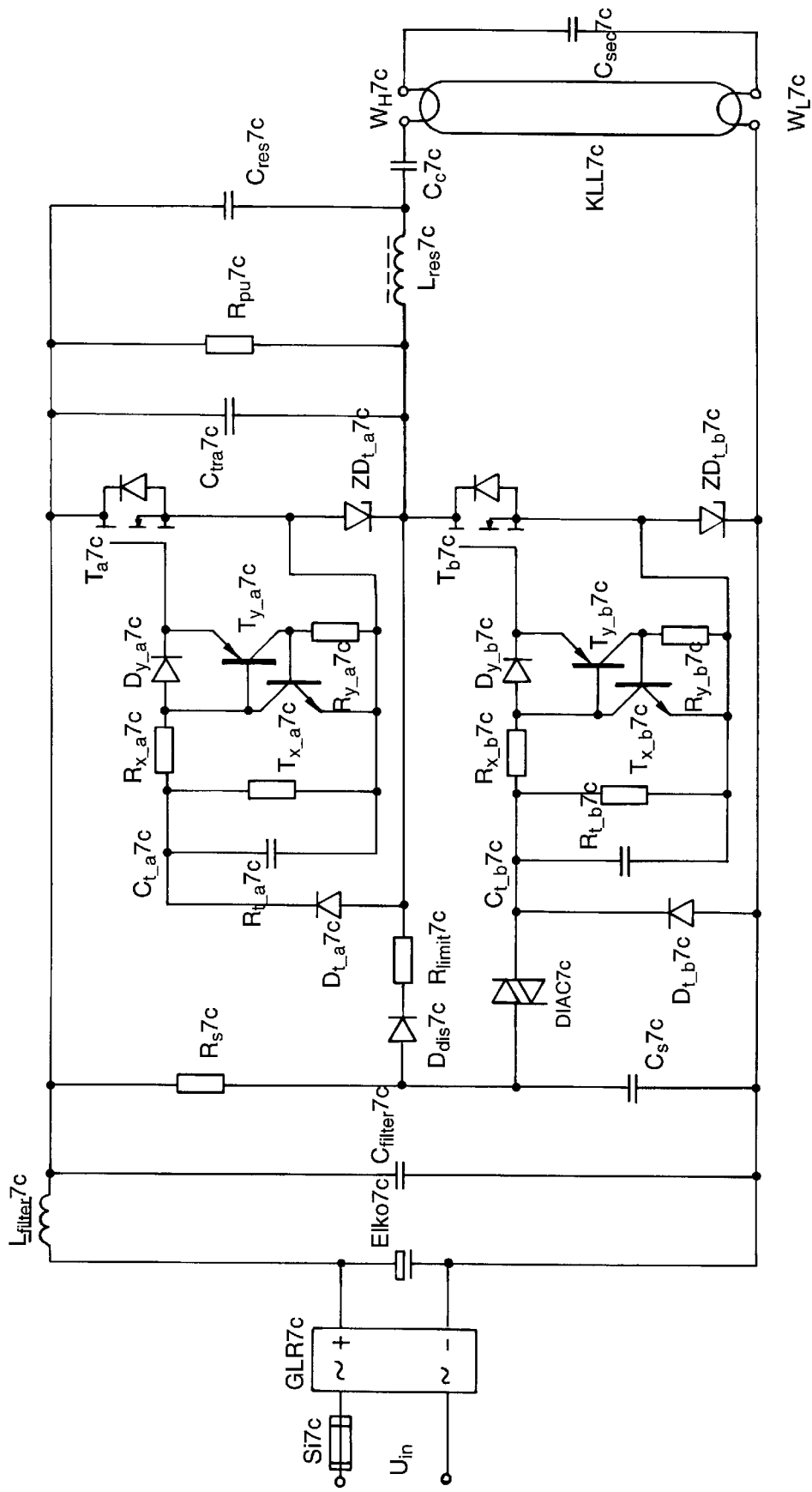
FIG. 7c is circuit for operating a load in accordance with another embodiment of the invention.

FIG. 7c also shows a thyristor turn-off device, but without the Zener diode for fixing the voltage difference between $C_t$ and gate voltage, at which the thyristor structure is to be fired. The voltage difference now corresponds to the forward voltage of the decoupling diode $D_y$ ($D_{y\_a}7c$ or $D_{y\_b}7c$)—since, after all, $C_t$ ($C_{t\_a}7c$ or $C_{t\_b}7c$) is initially charged higher by this approximately 0.6 V than the gate plus the emitter-base voltage of the pnp transistor $T_y$ ($T_{y\_a}7c$ or $T_{y\_b}7c$), which with $T_x$ ($T_{x\_a}7c$ or $T_{x\_b}7c$) forms the thyristor structure and discharges the gate of T ($T_a7c$ or $T_b7c$) directly and discharges $C_t$ via the current-limiting resistor $R_x$ ($R_{x\_a}7c$ or $R_{x\_b}7c$) $R_t$ ($R_{t\_a}7c$ or $R_{t\_b}7c$) must be designed with a higher resistance because of this slight difference.

However, the larger temperature coefficient of the difference threshold and the deviations resulting from a possible subassembly variation are disadvantageous in this simplified arrangement.

Furthermore, in FIG. 7c the filament $W_L7c$ is connected to the negative supply, while the resonance capacitor $C_{res}7c$ is connected to the positive supply.

Figure 7D:
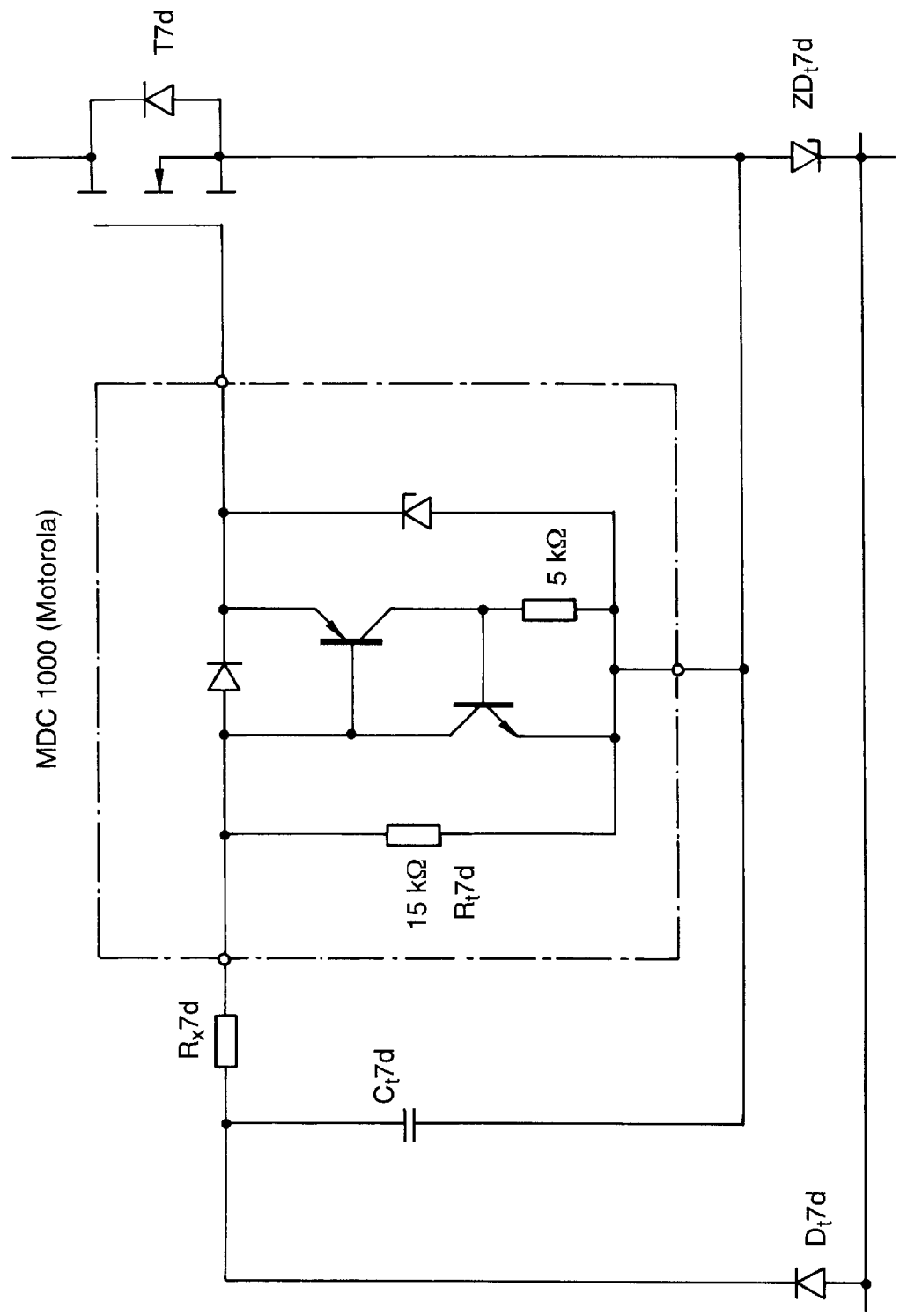

FIG. 7d shows the circuit of FIG. 7c with the use of the above-mentioned 3-pin module MDC1000 from Motorola for reducing the number of components. In this case, the internal resistance of 15 kΩ in the module MDC1000 is used as discharge resistor $R_t7d$ (together with $R_x7d$, which is connected in series for discharging purposes but is small). $R_x7d$ limits the discharging current of $C_t7d$ after firing of the thyristor structure.

Figure 8:
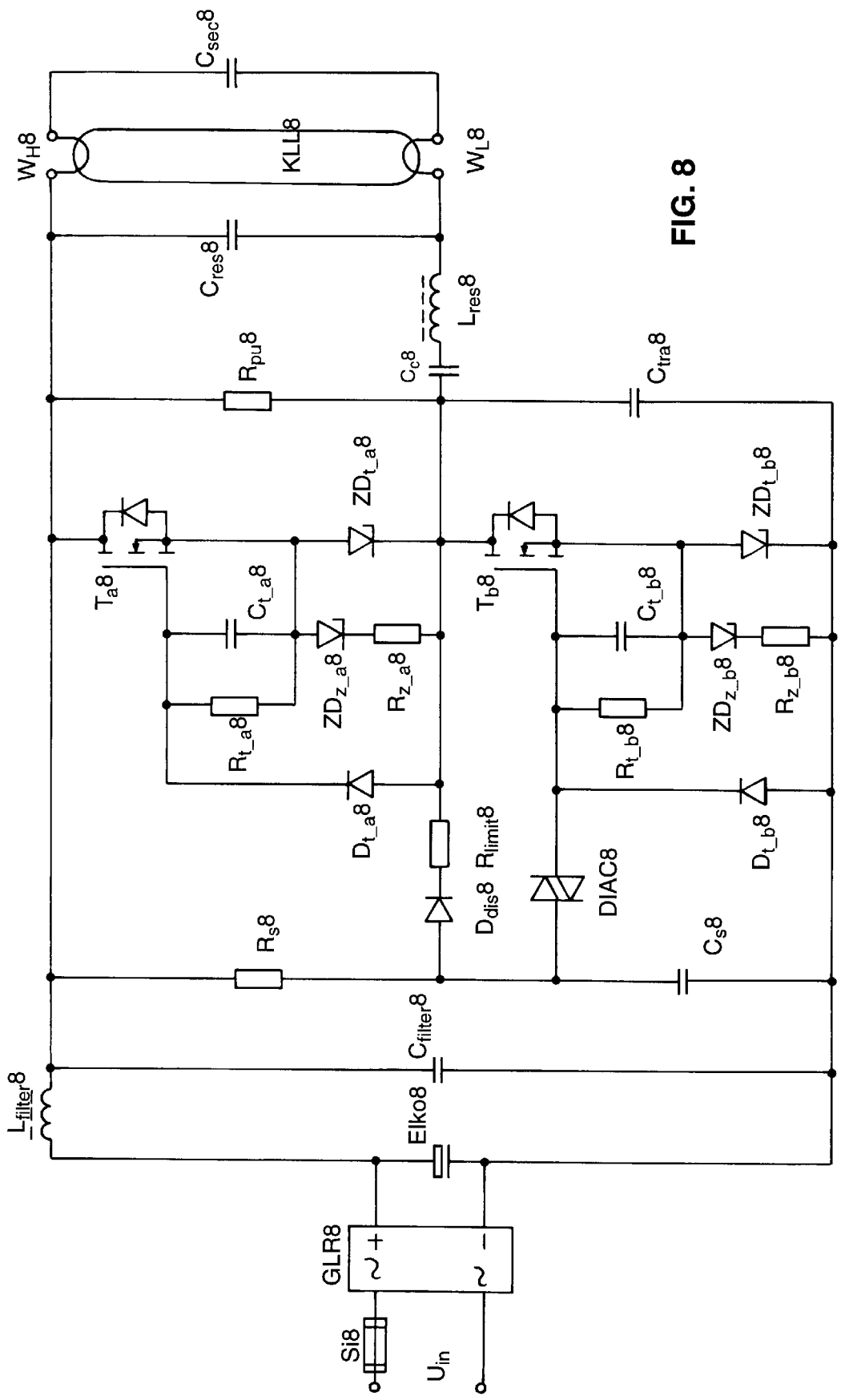
FIG. 8 is circuit for operating a load in accordance with another embodiment of the invention.

A resistor $R_z$ ($R_{z\_a}8$ or $R_{z\_b}8$) is proposed in FIG. 8 in series with a Zener diode $ZD_z$ ($ZD_{z\_a}8$ or $ZD_{z\_b}8$) in the freewheeling path. In order to reduce the losses during the transistor turn-on time, this series circuit is preferably short circuited by a further diode. This can likewise be constructed as a Zener diode $ZD_t$ ($ZD_{t\_a}8$ or $ZD_{t\_b}8$) with the higher voltage than $ZD_z$.

The peak voltage in $C_t$ can thus be influenced as a function of the level of the freewheeling current (for example during firing), as far as a maximum value, which is given by the second Zener diode $ZD_t$.

Furthermore, in FIG. 8 the sequence of $L_{res}8$ and $C_c8$ which are in series referred to the load current—is reversed, and $C_c8$ is connected to the half bridge centre point.

Figure 9:
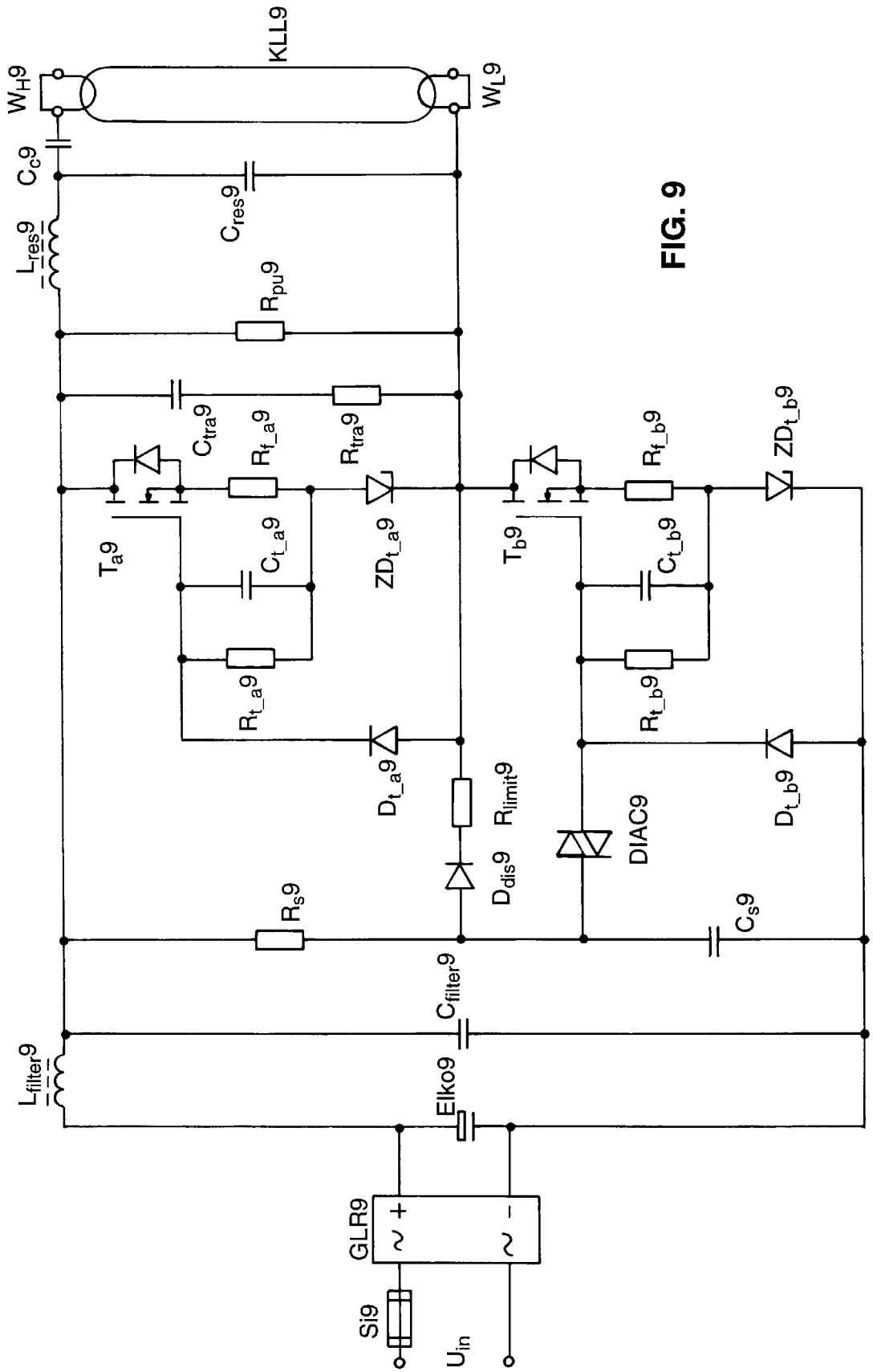
FIG. 9 is circuit for operating a load in accordance with another embodiment of the invention.

In FIG. 9, a negative-feedback resistor (known to the person skilled in the art) $R_{f\_a}9$ or $R_{f\_b}9$ is inserted into the source lead of the FET $T_a9$ or $T_b9$.

Furthermore, in FIG. 9 the resonance inductor $L_{res}9$ is not connected between the half bridge centre point and the lamp, but between the positive supply (the negative supply would also, of course, be possible) and, via $C_c9$, to the lamp at $W_H9$. The other filament $W_L9$ is connected to the half bridge centre point. The filaments $W_H9$ and $W_L9$ are short-circuited, and the entire lamp-parallel capacitance is combined in $C_{res}9$.

Bipolar power transistors are used in the following circuit designs of FIG. 10 to FIG. 14.

Figure 10:
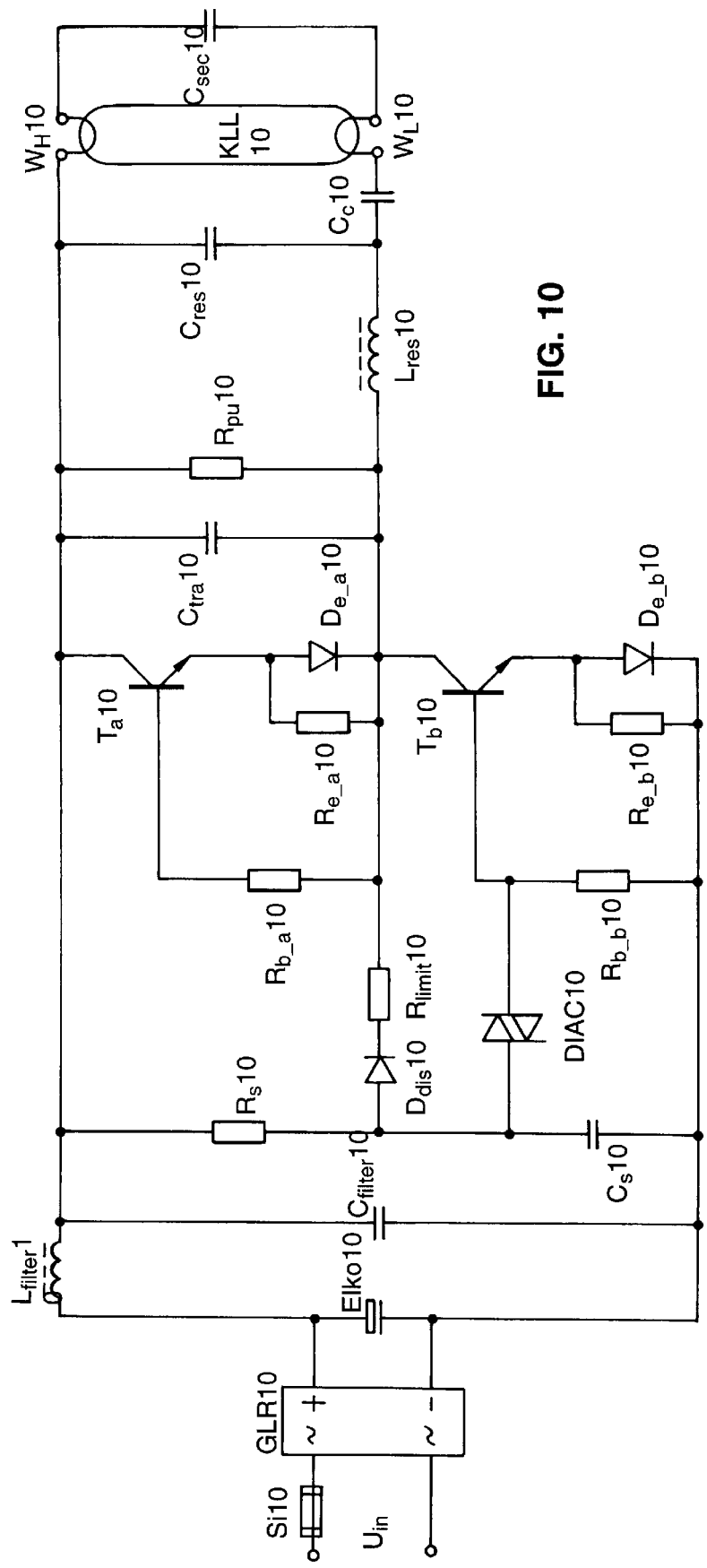
FIG. 10 is circuit for operating a load in accordance with another embodiment of the invention.

FIG. 10 shows in this case a minimal design without freewheeling diode, in which the freewheeling current flows via a base resistor $R_b$ ($R_{b\_a}10$ or $R_{b\_b}10$) through the base-collector diode of the bipolar power transistor T ($T_a10$ or $T_b10$) and floods the transistor with charge carriers such that said transistor still remains conducting during its storage time even after the end of the freewheeling time. The base resistor $R_b$ is necessary at least in the case of the lower transistor $T_b10$, since otherwise the first-time starting pulse from the DIAC cannot be fed into the base-emitter junction of $T_b10$. Instead of $T_a10$, a defined slow freewheeling diode would also theoretically suffice (as a "quasi power-switching element"); said freewheeling diode remains open further for a specific reverse recovery time after the phase in which the freewheeling current flows through it. Such defined slow diodes are not, however, available. However, $T_b10$ would have to be designed as a transistor (and thus as a power-switching element in any case) because of the above-mentioned possibility of first being driven by the DIAC.

The very simple circuit exhibits a very high scatter of the operating frequency (and thus also of the power), since the ON duration of the transistor is defined by its storage time and varies very strongly with subassembly variation, temperature, but also differing freewheeling phase. Consequently, a relatively high negative-feedback resistor $R_e$ ($R_{e\_a}10$ or $R_{e\_b}10$) is added to the emitter. So that said resistor does not too greatly impair the ignitability with its very much higher currents, it is short circuited in the design selected by diodes $D_e$ ($D_{e\_a}10$ or $D_{e\_b}10$) (compare DE 38 35 121 A1).

Figure 11:
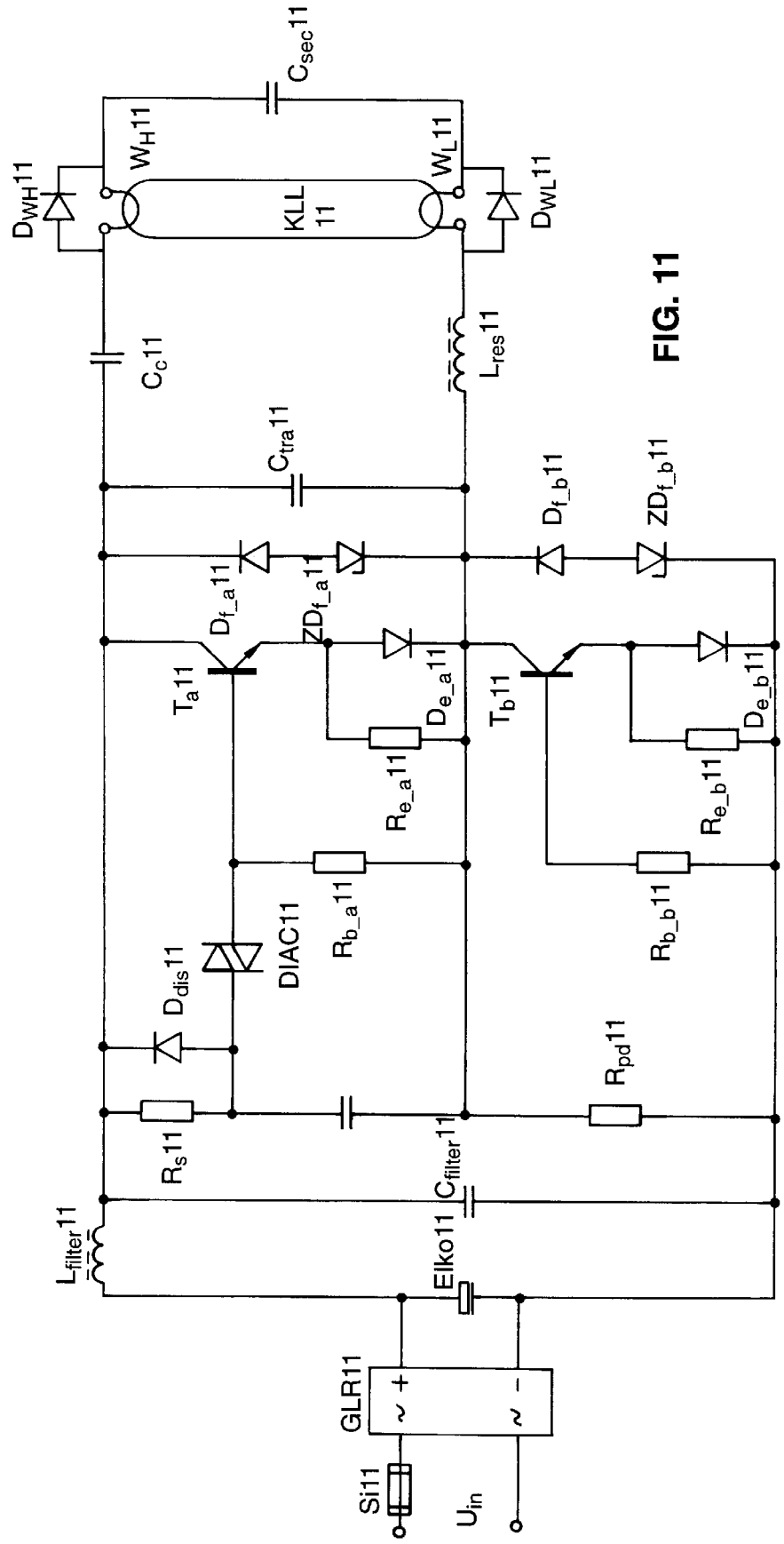
FIG. 11 is circuit for operating a load in accordance with another embodiment of the invention.

FIG. 11 already describes an improvement in the basic circuit of FIG. 10. Further arranged in parallel with the drive-freewheeling path composed of $R_b$ ($R_{b\_a}11$ or $R_{b\_b}11$) and the base-collector diode of T ($T_a11$ or $T_b11$) is a regular freewheeling diode $D_f$ ($D_{f\_a}11$ or $D_{f\_b}11$), whose forward threshold is increased by the voltage $U_{ZDf}$ by means of an additional anti-serial Zener diode $ZD_f$ ($ZD_{f\_a}11$ or $ZD_{f\_b}11$). As a result, the level of the base-collector current can be held constant during the freewheeling phase at approximately $U_{ZDf}$:$R_b$ (since the base-collector threshold voltage of T corresponds approximately to the forward voltage of the freewheeling diode $D_f$).

Furthermore, by contrast with the previous designs, in FIG. 11 it is not the lower transistor $T_b11$, but the upper transistor $T_a11$ which is firstly started by the DIAC, as a result of which the starting capacitor $C_s11$ is necessarily connected to the centre point of the half bridge as reference potential. $C_s11$ is charged by $R_s11$ from the positive supply, the centre point of the half bridge here requiring to be connected via a pull-down resistor $R_{pd}11$ to the negative supply. The discharge diode $D_{dis}11$ is connected in parallel with $R_s11$ to $C_s11$ by the anode.

The filaments $W_H11$ and $W_L11$ are short circuited by the diodes $D_{WH}11$ and $D_{WL}11$ in order, in each case, to conduct in the filament only a half wave of the resonance current flowing via $C_{sec}11$. It is thereby possible subsequently to undertake matching of the external wiring of the lamp to an otherwise non-optimum ohmic filament resistance.

Figure 12:
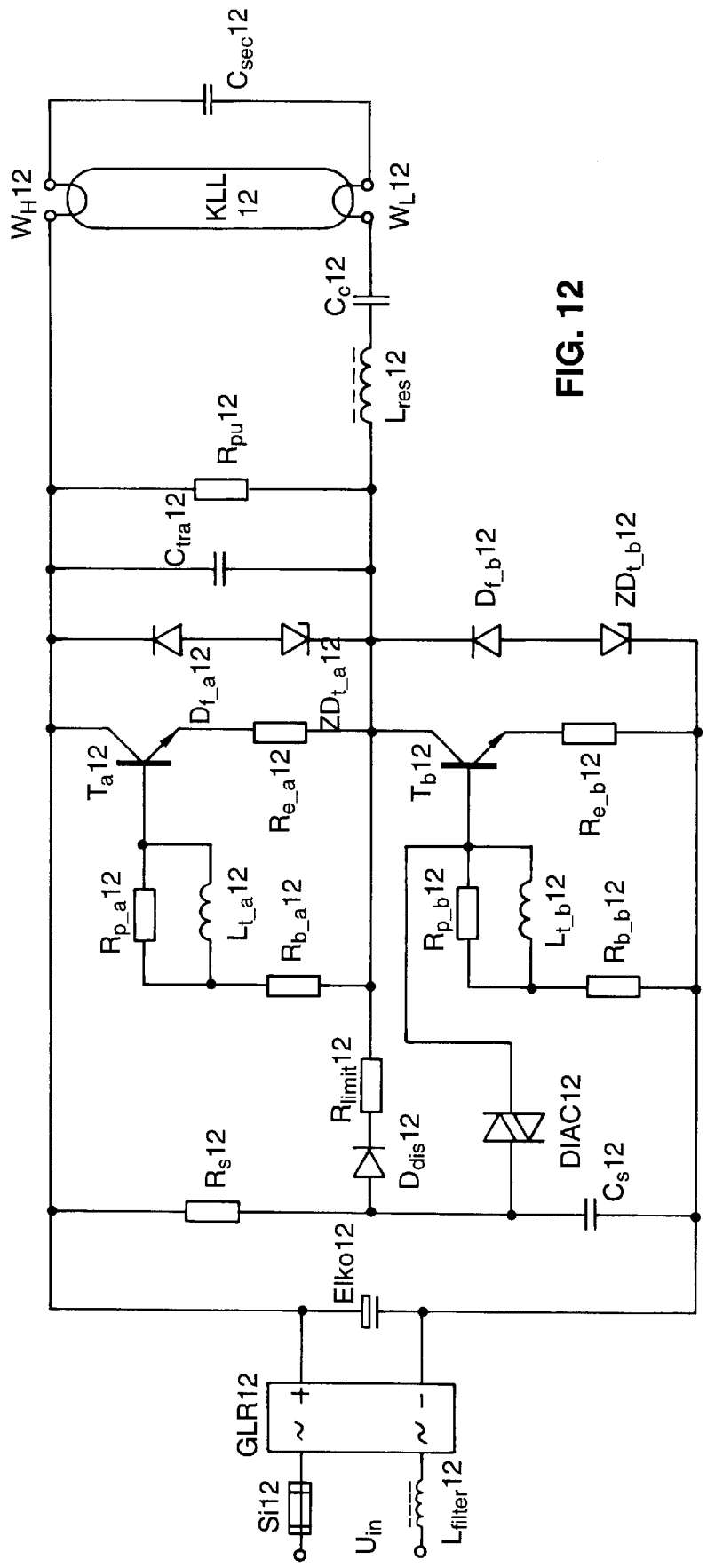
FIG. 12 is circuit for operating a load in accordance with another embodiment of the invention.

The circuit variant shown in FIG. 12 improves the operational performance by inserting in series with $R_b$ ($R_{b\_a}12$ or $R_{b\_b}12$) a parallel circuit composed of a control inductor $L_t$ ($L_{t\_a}12$ or $L_{t\_b}12$) and a damping resistor $R_p$ ($R_{p\_a}12$ or $R_{p\_b}12$). The effect of this is that a control current is impressed in $L_t$ during the freewheeling phase, the control current impressed in $L_t$ being further fed into the base-emitter junction of the transistor T ($T_a12$ or $T_b12$) after decay of the freewheeling current, this impressed control current decreasing in the process virtually linearly and finally vanishing, and there now being impressed in $L_t$ during the storage time of the transistor a negative depletion current which after expiry of the storage time depletes the base in a very defined fashion by means of the impressed negative control current.

The turn-on time of the transistor is now here no longer defined only by its storage time alone, but to a substantial extent by the control energy buffered in $L_t$. In addition, the turn-off performance is improved.

Furthermore, the filter capacitor $C_{filter}$ is dispensed with in FIG. 12, and the filter inductor $L_{filter}$ is positioned in the supply lead upstream of the electrolytic capacitor (Elko), here on the AC side upstream of the rectifier GLR12. $L_{filter}$ can, of course, also be connected into the two supply leads as an inductor with a split winding, and also as a current-compensated inductor, and can also be combined with further interference suppression components.

Figure 13:
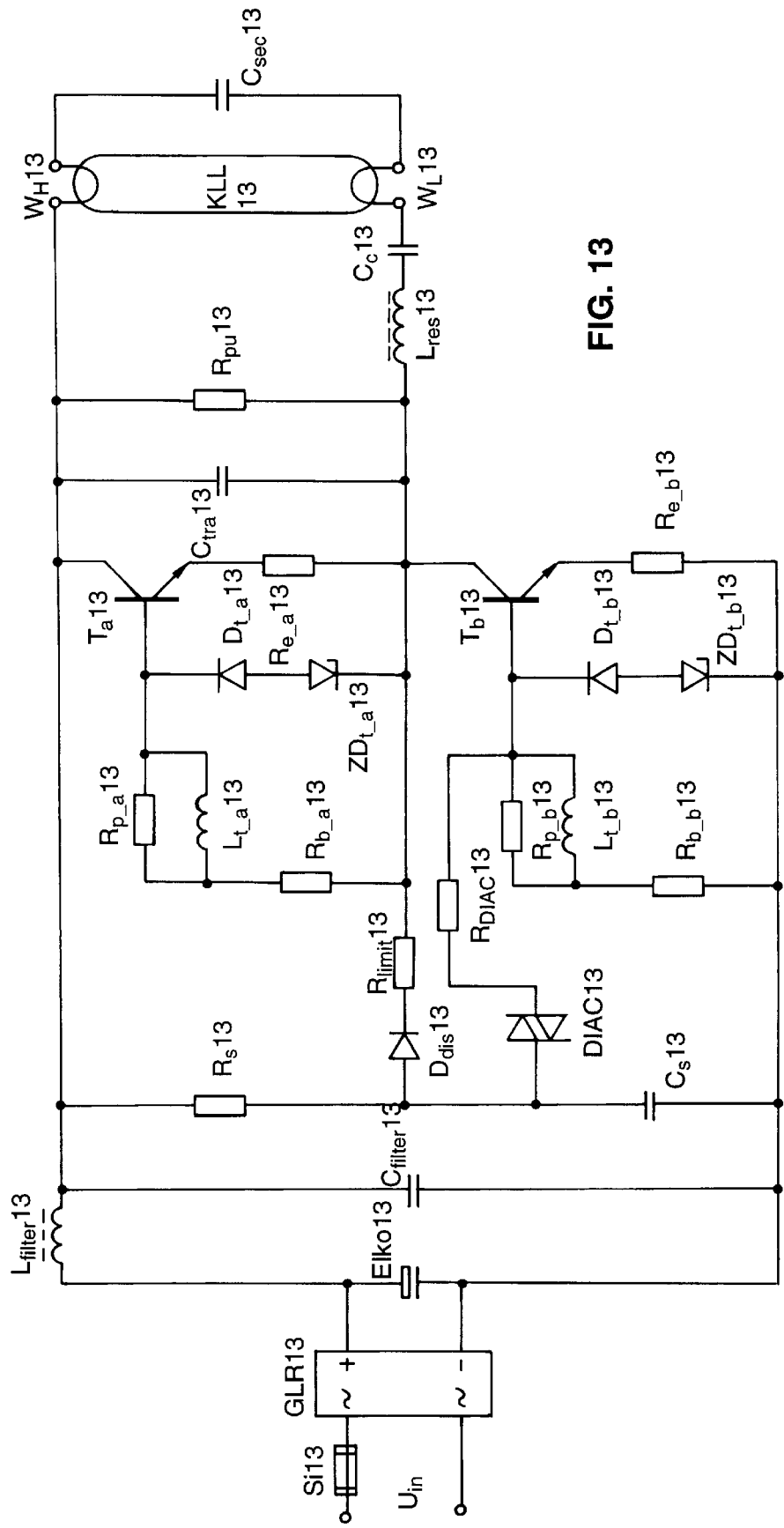
FIG. 13 is circuit for operating a load in accordance with another embodiment of the invention.

A further variation of the freewheeling drive is shown in FIG. 13. In this arrangement, the first step is to dispense with the series circuit, introduced in FIG. 11, composed of a freewheeling diode and anti-serial Zener diode, and thus the entire freewheeling current is fed into the base-collector diode of T ($T_a13$ or $T_b13$), but in order to limit the voltage across the emitter-base junction (to which the current rise in $L_t$ ($L_{t\_a}13$ or $L_{t\_b}13$) is also directly proportional) during the freewheeling phase, use is made of a series circuit composed of a small-signal diode $D_t$ ($D_{t\_a}13$ or $D_{t\_b}13$) and an anti-serial Zener diode $ZD_t$ ($ZD_{t\_a}13$ or $ZD_{t\_b}13$) in parallel with the series circuit composed of the base-emitter junction of T and the emitter resistor $R_e$ ($R_{e\_a}13$ or $R_{e\_b}13$). The lower price of the small-signal diode by comparison with the freewheeling diode (which is a quick high-voltage component) is an advantage as against the design in FIG. 12; a disadvantage is the lack of decoupling of the drive current from the level of the freewheeling current. As an alternative to the Zener diode in an anti-serial connection with the small-signal diode, it is also possible to use a series circuit composed of one or more further small-signal diodes.

In order to limit the amplitude of the DIAC starting pulse, a limiting resistor $R_{DIAC}13$ is connected in series with the DIAC.

Figure 14:
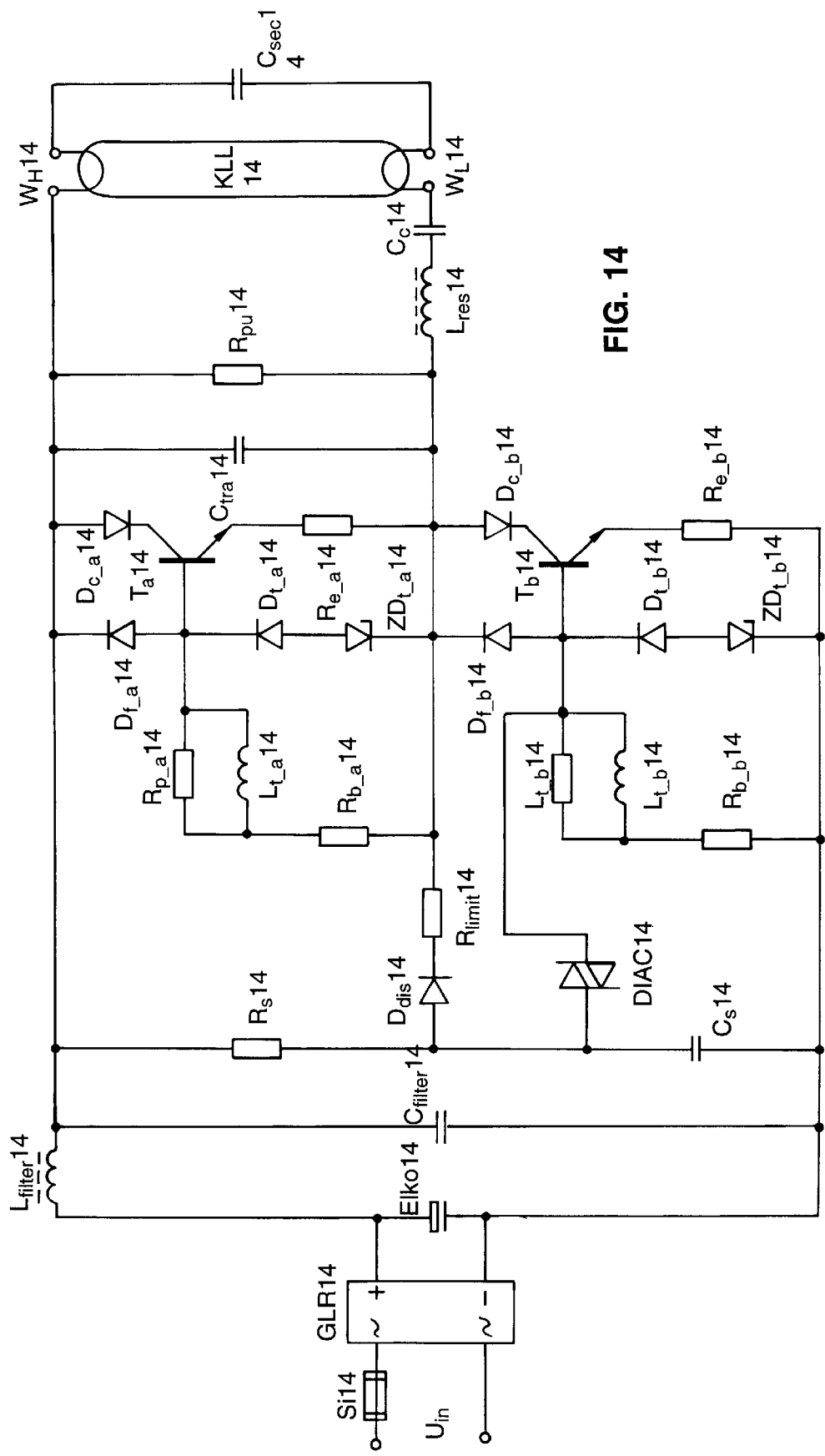
FIG. 14 is circuit for operating a load in accordance with another embodiment of the invention.

Compared with FIG. 13, the design in FIG. 14 further has additional freewheeling diodes $D_f$ ($D_{f\_a}14$ or $D_{f\_b}14$) from the base of the upper transistor $T_a14$ to the positive potential of the supply, and from the base of the lower transistor $T_b14$ to the centre potential of the half bridge. Consequently, at least a portion of the freewheeling current flows via this section and no longer flows through the base-collector diode of the transistor $T_a14$ or $T_b14$, it being possible to insert into the collector supply lead of the transistor a subassembly or a module which by means of its voltage drop during the freewheeling phase further favors the path of the freewheeling current via the inserted freewheeling diode $D_f$ and, in a particularly preferred embodiment, this component in series with the collector is a diode $D_c$ ($D_{c\_a}14$ or $D_{c\_b}14$), with the result that the entire freewheeling current is forced via the inserted freewheeling diode. Across the Zener section composed of the series circuit of the Zener diode $ZD_t$ ($ZD_{t\_a}14$ or $ZD_{t\_b}14$) and the small-signal diode $D_t$ ($D_{t\_a}14$ or $D_{t\_b}14$) parallel to the $R_b$-$L_t$-$R_p$ network, the freewheeling current generates a voltage drop which effects a current rise in $L_t$ ($L_{t\_a}14$ or $L_{t\_b}14$). This current impressed in $L_t$ is the single and, in addition, defined driving source for the transistor, with the result that merely the normal storage time of the transistor (as in the case of each saturable current transformer circuit) still causes a certain scatter. Of course, this storage time, and thus its scatter, could also be further reduced by means a desaturation circuit at T.

Of all the bipolar variants investigated, this has the lowest scatter, but also occasions the highest outlay.

The subassemblies and dimensions used by way of example in FIG. 1 to FIG. 14 are listed below. The following subassemblies are the same in all the exemplary embodiments here:

Si: 1 A medium time-lag
GLR: DF06M
Elko
(Electrolytic capacitor) 4.7 μF 350 V
$L_{filter}$: 1.5 mH SIEMENS-BC (bobbin core)
$C_{filter}$: 220 nF 400V MKT
$R_s$: 1 MΩ (except for FIG. 11)
$C_s$: 100 nF 63V
$D_{dis}$: 1N4004
DIAC: DB3N
$R_{limit}$: FIG. 1–FIG. 9: 330Ω FIG. 10–FIG. 14: 100Ω
$D_t$: 1N4148
T: FET: SSU1N50 (FIG. 1–FIG. 9) bipolar BUD43B FIG. 10–FIG. 14)
$R_{tra}$: 22Ω
$C_{tra}$: 1nF 630V MKP
$R_{pu}$: 470 kΩ
PTC: S1380 (175Ω cold resistance)

The other subassemblies are to be found from the following additional parts lists:

FIG. 1:
$R_{t\_a}/R_{t\_b}$: 680Ω
$C_{t\_a}/C_{t\_b}$: 6.8 nF 63V MKT
$ZD_{t\_a}/ZD_{t\_b}$: BZX 85/C15 (15V)
$L_{res}$: 3 mH EF16
$C_{res}$: 2.2 nF 1000V MKP
$C_c$: 47 nF 400V MKT
$C_{sec}$: 10 nF 500V MKT
$C_{PTC}$: 4.7 nF 500V MKT FIG. 2:
$R_{t\_a}2/R_{t\_b}2$: 470Ω
$C_{t\_a}2/C_{t\_b}2$: 6.8 nF 63V MKT
$L_{t\_a}2/L_{t\_b}2$: 4.7 mH SIEMENS-BC (bobbin core)
$ZD_{t\_a}2/ZD_{t\_b}2$: BZX 85/C 15 (15V)
$L_{res}2$: 3 mH EF16
$C_{res}2$: 2.2 nF 1000V MKP
$C_c2$: 47 nF 400V MKT
$C_{sec}2$: 10 nF 500V MKT
$C_{PTC}2$: 4.7 nF 500V MKT FIG. 3:
$R_{ct\_a}3/R_{ct\_b}3$: 22Ω
$C_{t\_a}3/C_{t\_b}3$: 6.8 nf 63V MKT
$R_{sa\_a}3/R_{sa\_b}3$: 10 kΩ
$D_{s\_a1}3/D_{s\_a2}3/D_{s\_b1}3/D_{s\_b2}3$: 1N4148
$T_{s\_a}3/T_{s\_b}3$: BC546B
$R_{l\_a}3/R_{l\_b}3$: 43Ω
$ZD_{t\_a}3/ZD_{t\_b}3$: BZX 85/C 15 (15V)
$L_{res}3$: 3 mH EF16
$C_{res}3$: 2.7 nF 1000V MKP
$C_c3$: 47 nF 400V MKT
$C_{sec}3$: 2.7 nF 1000V MKP FIG. 4:
$C_{t\_a}4/C_{t\_b}4$: 1.5 nF 63V MKT
$R_{tz\_a}4/R_{tz\_b}4$: 10 kΩ
$ZD_{d\_a}4/ZD_{d\_b}4$: BZX 55/C 6V8 (6.8V)
$R_{zb\_a}4/R_{zb\_b}4$: 10 kΩ
$R_{t\_a}4/R_{t\_b}4$: 4.7 kΩ
$R_{t2\_a}4/R_{t2\_b}4$: 220Ω
$T_{t\_a}4/T_{t\_b}4/T_{t2\_a}4/T_{t2\_b}4$: BC546B
$ZD_{t\_a}4/ZD_{t\_b}4$: BZX 85/C 15 (15V)
$L_{res}4$: 3 mH EF16
$C_c4$: 47 nF 400V MKT
$C_{res}4$: 6.8 nF 1000V MKP FIG. 5a:
$D_{s\_a}5a/D_{s\_b}5a$: 1N4148
$C_{t\_a}5a/C_{t\_b}5a$: 15 nF 63V MKT
$R_{bz\_a}5a/R_{bz\_b}5a$: 10 kΩ
$T_{s\_a}5a/T_{s\_b}5a$: BC556B
$ZD_{d\_a}5a/ZD_{d\_b}5a$: BZX 55/C 8V2 (8.2V)
$R_{d\_a}5a/R_{d\_b}5a$: 3.3 kΩ
$R_{t\_a}5a/R_{t\_b}5a$: 680Ω
$ZD_{t\_a}5a/ZD_{t\_b}5a$: BZX 85/C 15 (15V)
$L_{res}5a$: 3 mH EF16
$C_{c\_a}5a/C_{c\_b}5a$: 100 nF 250V MKT
$C_{res}5a$: 6.8 nF 1000V MKP FIG. 5b:
$D_{s\_a}5b/D_{s\_b}5b$: 1N4148
$C_{t\_a}5b/C_{t\_b}5b$: 15 nF 63V MKT
$R_{bz\_a}5b/R_{bz\_b}5b$: 10 kΩ
$T_{s\_a}5b/T_{s\_b}5b$: BC546B
$ZD_{d\_a}5b/ZD_{d\_b}5b$: BZX 55/C 8V2 (8.2V)
$R_{d\_a}5b/R_{d\_b}5b$: 3.3 kΩ
$R_{t\_a}5b/R_{t\_b}5b$: 620Ω
$ZD_{t\_a}5b/ZD_{t\_b}5b$: BZX 85/C 15 (15V)
$L_{res}5b$: 3 mH EF16
$C_{c\_a}5b/C_{c\_b}5b$: 100 nF 250V MKT
$C_{res}5b$: 6.8 nF 1000V MKP FIG. 6:
$C_{t\_a}6/C_{t\_b}6$: 6.8 nF 63V MKT
$R_{t\_a}6/R_{t\_b}6$: 680Ω
$D_{s\_a}6/D_{s\_b}6$: 1N4148
$R_{b\_a}6/R_{b\_b}6$: 10 kΩ
$T_{s\_a}6/T_{s\_b}6$: BC556B
$ZD_{t\_a}6/ZD_{t\_b}6$: BZX 85/C 15 (15V)
$L_{res}6$: 3 mH EF16
$C_c6$: 47 nF 400V MKT
$C_{res}6$: 2.2 nF 1000V MKP
$C_{sec}6$: 10 nF 500V MKT
$C_{PTC}6$: 3.3 nF 500V MKT FIG. 7a:
$C_{t\_a}7a/C_{t\_b}7a$ : 4.7 nF 63V MKT
$R_{t\_a}7a/R_{t\_b}7a$ : 3.6 kΩ
$ZD_{x\_a}7a/ZD_{x\_b}7a$ : BZX 55/C 3V6 (3.6V)
$C_{h\_a}7a/C_{h\_b}7a$: 1 nF 63V MKT
$R_{x\_a}7a/R_{x\_b}7a$: 100Ω
$D_{y\_a}7a/D_{y\_b}7a$: 1N4148
$T_{y\_a}7a/T_{y\_b}7a$: BC556B
$T_{x\_a}7a/T_{x\_b}7a$: BC546B
$R_{y\_a}7a/R_{y\_b}7a$: 5.1 kΩ
$ZD_{t\_a}7a/ZD_{t\_b}7a$: BZX 85/C 12 (12V)
$L_{res}7a$: 3 mH EF16
$C_{c\_a}7a/C_{c\_b}7a$: 100 nF 250V MKT
$C_{res}7a$: 6.8 nF 1000V MKP
$C_{sec}7a$: 6.8 nF 500V MKT
$C_{PTC}7a$: 3.3 nF 500V MKT
FIG. 7b:
$C_t7b$: 4.7 nF 63V MKT
$R_t7b$: 4.7 kΩ
$ZD_x7b$: BZX 55/C3V6 (3.6V)
$C_h7b$: 1 nF 63V MKT
$R_x7b$: 100Ω
MDC1000 (Motorola)
$ZD_t7b$: BZX 85/C12 (12V)
FIG. 7c:
$C_{t\_a}7c/C_{t\_b}7c$: 6.8 nF 63V MKT
$R_{t\_a}7c/R_{t\_b}7c$: 15 kΩ
$R_{x\_a}7c/R_{x\_b}7c$: 100Ω
$D_{y\_a}7c/D_{y\_b}7c$: 1N4148
$T_{y\_a}7c/T_{y\_b}7c$: BC556B
$T_{x\_a}7c/T_{x\_b}7c$: BC546B
$R_{y\_a}7c/R_{y\_b}7c$: 5.1 kΩ
$ZD_{t\_a}7c/ZD_{t\_b}7c$: BZX 85/C 12 (12V)
$L_{res}7c$: 3 mH EF16
$C_{c\_a}7c/C_{c\_b}7c$: 100 nF 250V MKT
$C_{res}7c$: 6.8 nF 1000V MKP
$C_{sec}7c$: 6.8 nF 500V MKT
FIG. 7d:
$C_t7d$: 4.7 nF 63V MKT
($R_t7d$: 15 kΩ—contained in the MDC 1000)
$R_x7d$ 100Ω
MDC1000 (Motorola)
$ZD_t7d$ BZX 85/C12 (12V)
FIG. 8:
$R_{t\_a}8/R_{t\_b}8$: 680Ω
$C_{t\_a}8/C_{t\_b}8$: 6.8 nF 63V MKT
$ZD_{z\_a}8/ZD_{z\_b}8$: BZX 85/C 12 (12V)
$R_{z\_a}8/R_{z\_b}8$: 10Ω
$ZD_{t\_a}8/ZD_{t\_b}8$: BZX 85/C 15 (15V)
$L_{res}8$: 3 mH EF16
$C_{res}8$: 3.3 nF 1000V MKP
$C_c8$: 47 nF 400V MKT
$C_{sec}8$: 3.3 nF 1000V MKP
FIG. 9:
$R_{t\_a}9/R_{t\_b}9$: 680Ω
$C_{t\_a}9/C_{t\_b}9$: 6.8 nF 63V MKT
$R_{f\_a}9/R_{f\_b}9$: 3.3Ω
$ZD_{t\_a}9/ZD_{t\_b}9$: BZX 85/C 15 (15V)
$L_{res}9$ 3 mH EF16
$C_{res}9$ 6.8 nF 1000V MKP
$C_c9$: 47 nF 400V MKT
FIG. 10:
$R_{b\_a}10/R_{b\_b}10$: 33Ω
$R_{e\_a}10/R_{e\_b}10$: 3.3Ω
$D_{e\_a}10/D_{e\_b}10$: BA157GP
$L_{res}10$: 2.5 mH EF16
$C_{res}10$: 6.8 nF 1000V MKP
$C_c10$: 47 nF 400V MKT
$C_{sec}10$: 3.3 nF 1000V MKP
FIG. 11:
$R_s11$: 680 kΩ
$R_{pd}11$: 330 kΩ
$R_{b\_a}11/R_{b\_b}11$: 33Ω
$R_{e\_a}11/R_{e\_b}11$: 3.3Ω
$D_{e\_a}11/D_{e\_b}11$: BA157GP
$D_{f\_a}11/D_{f\_b}11$: BA157GP
$ZD_{f\_a}11/ZD_{f\_b}11$: BZX 55/C 5V1 (5.1V)
$L_{res}11$: 2.5 mH EF16
$C_c11$: 47 nF 400V MKT
$D_{WH}11/D_{WL}11$: BA157GP
$C_{sec}11$: 10 nF 1000V MKP
FIG. 12:
$L_{filter}12$: 2.2 mH SIEMENS-LBC (large bobbin core)
$R_{b\_a}12/R_{b\_b}12$: 22Ω
$L_{t\_a}12/L_{t\_b}12$: 100 µH SIEMENS-BC (bobbin core)
$R_{p\_a}12/R_{p\_b}12$: 330Ω
$R_{e\_a}12/R_{e\_b}12$: 2.2Ω
$D_{f\_a}12/D_{f\_b}12$: BA157GP
$ZD_{f\_a}12/ZD_{f\_b}12$: BZX 55/C 5V1 (5.1V)
$L_{res}12$: 3.5 mH EF16
$C_c12$: 47 nF 400V MKT
$C_{sec}12$: 10 nF 1000V MKP
FIG. 13:
$R_{DIAC}13$: 22Ω
$R_{b\_a}13/R_{b\_b}13$: 22Ω
$L_{t\_a}13/L_{t\_b}13$: 220 µH SIEMENS-BC (bobbin core)
$R_{p\_a}13/R_{p\_b}13$: 220Ω
$R_{e\_a}13/R_{e\_b}13$: 4.3Ω
$D_{t\_a}13/D_{t\_b}13$: 1N4148
$ZD_{t\_a}13/ZD_{t\_b}13$: BZX 55/C 4V3 (4.3V)
$L_{res}13$: 3.5 mH EF16
$C_c13$: 47 nF 400V MKT
$C_{sec}13$: 10 nF 1000V MKP
FIG. 14:
$R_{b\_a}14/R_{b\_b}14$: 22Ω
$L_{t\_a}14/L_{t\_b}14$: 100 µH SIEMENS-BC (bobbin core)
$R_{p\_a}14/R_{p\_b}14$: 330Ω
$R_{e\_a}14/R_{e\_b}14$: 2.2Ω
$D_{f\_a}14/D_{f\_b}14$: BA157GP
$D_{t\_a}21/D_{t\_b}14$: 1N4148
$ZD_{t\_a}14/ZD_{t\_b}14$: BZX 55/C 6V8 (6.8V)
$D_{c\_a}14/D_{c\_b}14$: BA157GP
$L_{res}14$: 3.5 mH EF16
$C_c14$: 47 nF 400V MKT $C_{sec}14$: 10 nF 1000V MKP The dimensioning of the control components need not necessarily be the same for $T_a$ and $T_b$. However, in the applications shown here a pulse duty factor of 50% is favorable, for which reason the same drive design was selected for $T_a$ and $T_b$.

I claim:

1. Circuit for operating a load, having at least one power-switching element (T) with an anti-parallel freewheeling section through which it is possible for a freewheeling current which is anti-parallel relative to the conducting state of the at least one power-switching element to flow during a freewheeling phase, characterized in that after the initial start of the circuit into its operating state the energy is obtained for the purpose of controlling the at least one power-switching element (T) in its switched-on state by using the freewheeling current, said freewheeling section includes a component or a module across which the freewheeling current generates a voltage drop which provides in a control energy storage element the energy for controlling the at least one power-switching element.

2. Circuit according to claim 1, characterized in that the circuit is an electronic ballast (EB) for operating a lamp, preferably a low-pressure discharge lamp, preferably in the power range up to a few tens of Watts.

3. Circuit according to claim 1, characterized in that the component inserted into the freewheeling section is a Zener diode ($Zd_t$).

4. Circuit according to claim 2, characterized in that use is made of a half-bridge circuit having a resonant circuit, comprising a power inductor ($L_{res}$) and at least one resonance capacitor ($C_{res}$) which is directly or indirectly parallel with the lamp.

5. Circuit according to one of claim 3, characterized in that the at least one power-switching element is a voltage-controlled component, for example an FET, and the voltage impulse function, which is formed during the freewheeling phase by the component or the module inserted into the assigned freewheeling section, is buffered via a diode ($D_t$) and a capacitor ($C_t$), and said capacitor is connected directly or via further components to the gate of the at least one power-switching element, and said capacitor is discharged again via a discharge circuit after expiration of the freewheeling phase, and the ON duration of the circuit is defined thereby.

6. Circuit according to claim 5, characterized in that a resistor ($R_t$) is used to discharge the capacitor ($C_t$).

7. Circuit according to claim 5, characterized in that to discharge the capacitor ($C_t$) use is made of an inductor ($L_t$) and a component, for example a resistor ($R_t$), or a module for damping the resonant circuit comprising the capacitor ($C_t$) and the inductor ($L_t$).

8. Circuit according to claim 5, characterized in that a constant-current sync is used to discharge the capacitor ($C_t$).

9. Circuit according to claim 5, characterized in that a discharge circuit with a switchable time constant is used to discharge the capacitor ($C_t$), the discharging being performed initially in a high-resistance fashion and then—starting from a defined voltage threshold—in a lower-resistance fashion.

10. Circuit according to claim 6, characterized in that an additional module in series with the capacitor ($C_t$) prevent the capacitor ($C_t$) from being fully discharged.

11. Circuit according to claim 5, characterized in that switching off the at least one power-switching element is accelerated by an additional circuit comprising a charging diode ($D_s$) between the gate of the at least one power-switching element (T) and the capacitor ($C_t$), a resistor between the capacitor-side of the charging diode and the base of a transistor ($T_s$) whose emitter is connected to the gate and whose collector is connected to the source.

12. Circuit according to claim 6, characterized in that the capacitor ($C_t$) and its parallel discharge resistor ($R_t$) are decoupled from the gate of the at least one power-switching element (T) via at least one diode ($ZD_x$), as a result of which the gate is charged to the peak voltage of the capacitor ($C_t$) minus the forward voltage of the diode, but subsequent discharging of the gate with the discharging of the capacitor ($C_t$) is prevented by the now blocking diode until a thyristor structure is fired which rapidly discharges the capacitor ($C_t$) and the input capacitance of the at least one power-switching element (T), and a square-wave control voltage is thereby generated at the gate.

13. Circuit according to claim 1, characterized in that an additional resistor ($R_z$) is inserted in series with a Zener diode ($ZD_z$) in the freewheeling section.

14. Circuit according to claim 13, characterized in that this resistor ($R_z$), preferably the entire series circuit composed of this resistor and the Zener diode ($ZD_z$), is short-circuited by an additional diode ($ZD_t$).

15. Circuit according to claim 14, characterized in that said additional diode is constructed as a Zener diode ($ZD_t$).

16. Circuit according to claim 1, characterized in that a negative-feedback resistor ($R_f$) is inserted into a source terminal or emitter terminal of the at least one power-switching element (T).

17. Circuit according to claim 1, characterized in that the at least one power-switching element (T) is a bipolar transistor which is turned on directly or indirectly by the freewheeling current and whose ON duration is determined by its charge-carrier storage time or by a control current which is impressed in a control inductor ($L_t$) and decreases after the freewheeling phase, or else by a combination of storage time and control current.

18. Circuit according to claim 17, characterized in that the freewheeling current can flow via a base-side resistor ($R_b$) and the base-collector diode of the bipolar transistor (T), as a result of which the transistor is flooded with charge carriers such that even without the base being driven after the freewheeling phase—it still remains open for a few $\mu s$ in excess of its charge-carrier storage time, and permits a collector-emitter current until it is turned off.

19. Circuit according to claim 18, characterized in that a freewheeling diode ($D_f$) with an anti-serial Zener diode ($ZD_f$) is connected in parallel with the transistor (T), as a result of which a portion of the freewheeling current flows off via this freewheeling section, which has an increased forward voltage, and a second portion, which is thereby held constant, floods the base-collector diode.

20. Circuit according to claim 18, characterized in that in addition to the base resistor ($R_b$), a parallel circuit composed of a control inductor ($L_t$) and a damping resistor ($R_p$) is inserted into the base supply lead of the bipolar transistor (T).

21. Circuit according to claim 20, characterized in that a series circuit composed of a plurality of diodes or a Zener diode ($ZD_t$) and an antiserial diode ($D_t$) is connected in parallel with the series circuit composed of the base resistor ($R_b$) and the parallel circuit composed of the damping resistor ($R_p$) and the control inductor ($L_t$) so that during the freewheeling phase the negative voltage across the base-emitter junction of the bipolar transistor (T), and thus also the voltage which defines the current rise in the control inductor ($L_t$) during the freewheeling phase, are limited.

22. Circuit according to claim 17, characterized in that when use is made of a half bridge with two bipolar transistors (T) there is connected in each case from the base of the transistor on the positive potential side to the positive potential, and from the base of the transistor on the negative side to the centre point of the half bridge a freewheeling diode ($D_f$) which accepts at least a portion of the freewheeling current which without this diode would flow entirely through the base-collector diode.

23. Circuit according to claim 22, characterized in that inserted into the collector supply lead of each of the two bipolar transistors (T) is an assembly ($D_c$) or a module which, during the freewheeling phase, via its voltage drop reduces the current flowing through the base-collector diode in favor of a portion of the current flowing off via the freewheeling diode ($D_f$).

24. Circuit according to claim 23, characterized in that the assembly in series with the collector is a diode ($D_c$).

* * * * *